(12) United States Patent
Tomida et al.

(10) Patent No.: US 9,648,486 B2
(45) Date of Patent: May 9, 2017

(54) RADIO COMMUNICATION APPARATUS, RADIO COMMUNICATION METHOD, COMPUTER-READABLE MEDIUM, SLAVE DEVICE, AND MASTER DEVICE

(71) Applicant: CASIO COMPUTER CO., LTD., Shibuya-ku, Tokyo (JP)

(72) Inventors: Takahiro Tomida, Hamura (JP); Toshihiro Takahashi, Kunitachi (JP); Tsutomu Terazaki, Saitama (JP); Ryo Okumura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/660,485

(22) Filed: Mar. 17, 2015

(65) Prior Publication Data

US 2015/0271819 A1 Sep. 24, 2015

(30) Foreign Application Priority Data

Mar. 19, 2014 (JP) .................................. 2014-057215

(51) Int. Cl.

| H04B 7/00 | (2006.01) |
|---|---|
| H04W 8/00 | (2009.01) |
| H04W 76/02 | (2009.01) |
| H04W 84/20 | (2009.01) |
| H04W 24/00 | (2009.01) |
| H04W 28/02 | (2009.01) |
| H04W 52/02 | (2009.01) |
| H04L 12/413 | (2006.01) |
| H04L 29/08 | (2006.01) |
| H04W 4/00 | (2009.01) |

(52) U.S. Cl.
CPC ........... *H04W 8/005* (2013.01); *H04W 24/00* (2013.01); *H04W 28/02* (2013.01); *H04W 52/0277* (2013.01); *H04W 76/023* (2013.01); *H04W 76/027* (2013.01); *H04W 84/20* (2013.01); *H04L 67/12* (2013.01); *H04W 4/008* (2013.01)

(58) Field of Classification Search
CPC .................................................. H04W 52/0277
USPC .............................................. 455/41.2, 343.5
See application file for complete search history.

(56) References Cited

U.S. PATENT DOCUMENTS

| 2002/0167961 A1* | 11/2002 | Haartsen ................ H04W 72/10 370/444 |
| 2014/0099987 A1* | 4/2014 | Saito ........................ H04W 4/08 455/519 |
| 2016/0057037 A1* | 2/2016 | Osuga ................. H04L 43/0835 370/235 |

FOREIGN PATENT DOCUMENTS

JP 2012142877 A 7/2012

* cited by examiner

*Primary Examiner* — Ayodeji Ayotunde
(74) *Attorney, Agent, or Firm* — Holtz, Holtz & Volek PC

(57) ABSTRACT

In CE4, a communication terminal transmits data including a latency_off value "1". After receiving the data, an environment information measuring apparatus transmits data since a latency counter value is "0". The latency counter value becomes "2" and a latency_off counter value becomes "1". In CE5, the communication terminal transmits data including a latency_off value "0". Since each of the latency counter value and the latency_off counter value is not "0", the environment information measuring apparatus does not receive the data from the communication terminal. The latency counter value becomes "1" and the latency_off counter value becomes "0". In CE6, since the latency_off counter value is "0", the environment information measuring apparatus receives the data from the communication terminal.

9 Claims, 14 Drawing Sheets

FIG. 11

| BUFFER | SET VALUE |
|---|---|
| BUFFER OF NUMBER OF TIMES OF LATENCY (lat) | VALUE OF NUMBER OF TIMES OF LATENCY: "2" |
| LATENCY COUNTER (C_lat) | LATENCY COUNTER VALUE: "2" |
| INTERVAL COUNTER (C_connint) | INTERVAL TIME: "THREE SECONDS" |
| LATENCY_OFF COUNTER (C_latoff) | LATENCY_OFF COUNTER VALUE: "2" |

RADIO COMMUNICATION APPARATUS, RADIO COMMUNICATION METHOD, COMPUTER-READABLE MEDIUM, SLAVE DEVICE, AND MASTER DEVICE

BACKGROUND

1. Technical Field

An embodiment of the present invention relates to a radio communication apparatus, a radio communication method, a computer-readable medium, a slave device, and a master device.

2. Related Art

A master device which is a radio communication apparatus to perform radio communication based on Bluetooth (registered trademark) low energy which is a near field communication standard receives identification information which is transmitted from a slave device which is a radio communication apparatus to be a communication partner and which is called an advertisement. After transmitting a connection request signal to the slave device and establishing connection therewith, the master device transmits/receives data to/from the slave device (see, for example, JP 2012-142877 A).

In such a radio communication apparatus, especially in a slave device, a buttery having small capacity such as a coin battery or a button battery is used as a power source. Thus, after connection between the master device and the slave device is established, by alternately switching an operation state and a stopped state of a transmission/reception unit, transmission/reception of data is performed intermittently at certain intervals and power consumption is controlled. In addition, the slave device can control power consumption by performing control called a slave latency operation in which data intermittently transmitted from the master device is not successively received in a range of the number of times of latency designated by the master device. The actual number of times of limitation of reception in a case where the slave latency operation is performed is determined by the slave device.

However, in a related art, when a slave latency operation is performed, a slave device determines whether to receive data from a master device. Thus, there has been a problem that a frequency of data transmission in the slave device is determined according to determination by the slave device determines whether to perform reception even when a quick response is necessary in the master device while the slave latency operation is performed and that a response speed in the master device is limited.

An embodiment of the present invention has been provided in view of the forgoing and is to provide a radio communication apparatus, a radio communication method, a computer-readable medium, a slave device, and a master device with which limitation in a response speed can be prevented.

SUMMARY

A radio communication apparatus configured to perform radio communication with a radio communication apparatus of a communication partner includes: a communication unit configured to: receive data intermittently transmitted from the radio communication apparatus of the communication partner; and transmit data to the radio communication apparatus of the communication partner based on the data; and a control unit configured to limit reception of data until the number of times of transmission of the data intermittently transmitted from the radio communication apparatus of the communication partner reaches the number of times of limitation of reception of data; set the specific number of times which is indicated by specific information included in the received data and which is smaller than the number of times of limitation; and release the limitation when the number of times of transmission of the data intermittently transmitted from the radio communication apparatus of the communication partner reaches the specific number of times.

According to an embodiment of the present invention, it is possible to prevent limitation in a response speed.

BRIEF DESCRIPTION OF THE DRAWINGS

FIG. 11 is a view illustrating a setting example of each buffer;

DETAILED DESCRIPTION

In the following, an embodiment of the present invention will be described with reference to the drawings.

Figure 1:
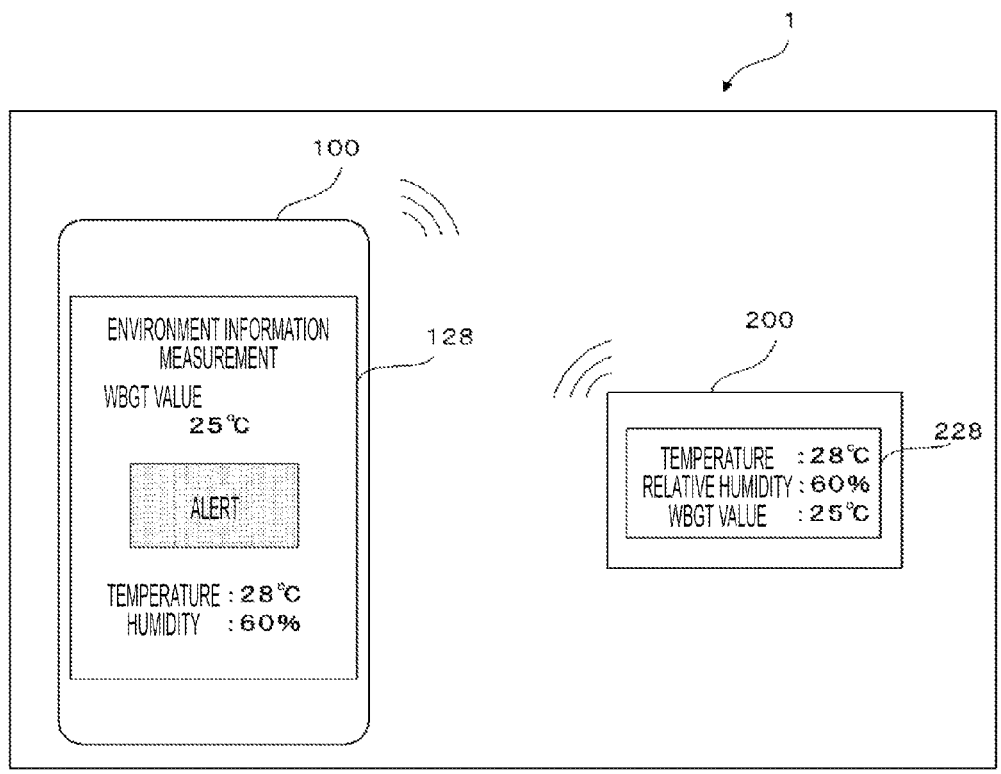
FIG. 1 is a view illustrating a configuration example of a radio communication system according to an embodiment of the present invention.

FIG. 1 is a view illustrating a configuration example of a radio communication system according to an embodiment of the present invention.

In the configuration example illustrated in FIG. 1, a radio communication system 1 includes a communication terminal 100 (second radio communication apparatus) as a radio communication apparatus and an environment information measuring apparatus 200 (first radio communication apparatus) as a radio communication apparatus different from the communication terminal 100. Based on the Bluetooth (registered trademark) low energy (hereinafter, referred to as BLE), the communication terminal 100 and the environment information measuring apparatus 200 perform radio communication with each other. The BLE is a standard (mode) designed for low power consumption in a near field radio communication standard called the Bluetooth (registered trademark). As a radio communication apparatus to perform radio communication based on the BLE, there are a radio communication apparatus referred to as a master device (also referred to as "central") and a radio communication apparatus referred to as a slave device (also referred to as "peripheral"). The master device is a device to use a service (such as measurement data) provided by the slave device. Also, the slave device is a device to provide a service (such as measurement data) to the master device. In the present embodiment, the communication terminal 100 corresponds to the master device and the environment information measuring apparatus 200 corresponds to the slave device.

The communication terminal 100 is a portable terminal such as a mobile phone, a smartphone, a tablet-type personal computer, or a notebook-type personal computer and includes a radio communication function which is based on the BLE. In the present embodiment, for example, the communication terminal 100 includes a smartphone. The communication terminal 100 receives data such as temperature, relative humidity, or a wet bulb globe temperature (WBGT) value from the environment information measuring apparatus 200. Based on the received data, the communication terminal 100 displays various kinds of information as environment information on a display unit 128 described later or makes sound such as an alarm from a speaker 124. Note that the WBGT value is, for example, an index value indicating a degree of tendency of heatstroke got by a worker in a working environment.

The environment information measuring apparatus 200 is installed at a place, where temperature, relative humidity, and a WBGT value are to be measured, such as a factory, a construction site, a work site, a gymnasium, or an athletic field. The environment information measuring apparatus 200 measures a temperature and relative humidity of an installation place and calculates a WBGT value from the measurement value. Then, the environment information measuring apparatus 200 transmits data such as temperature, relative humidity, or a WBGT value to the communication terminal 100.

Next, a hardware configuration and the like of the radio communication system 1 according to the present embodiment will be described.

Figure 2:
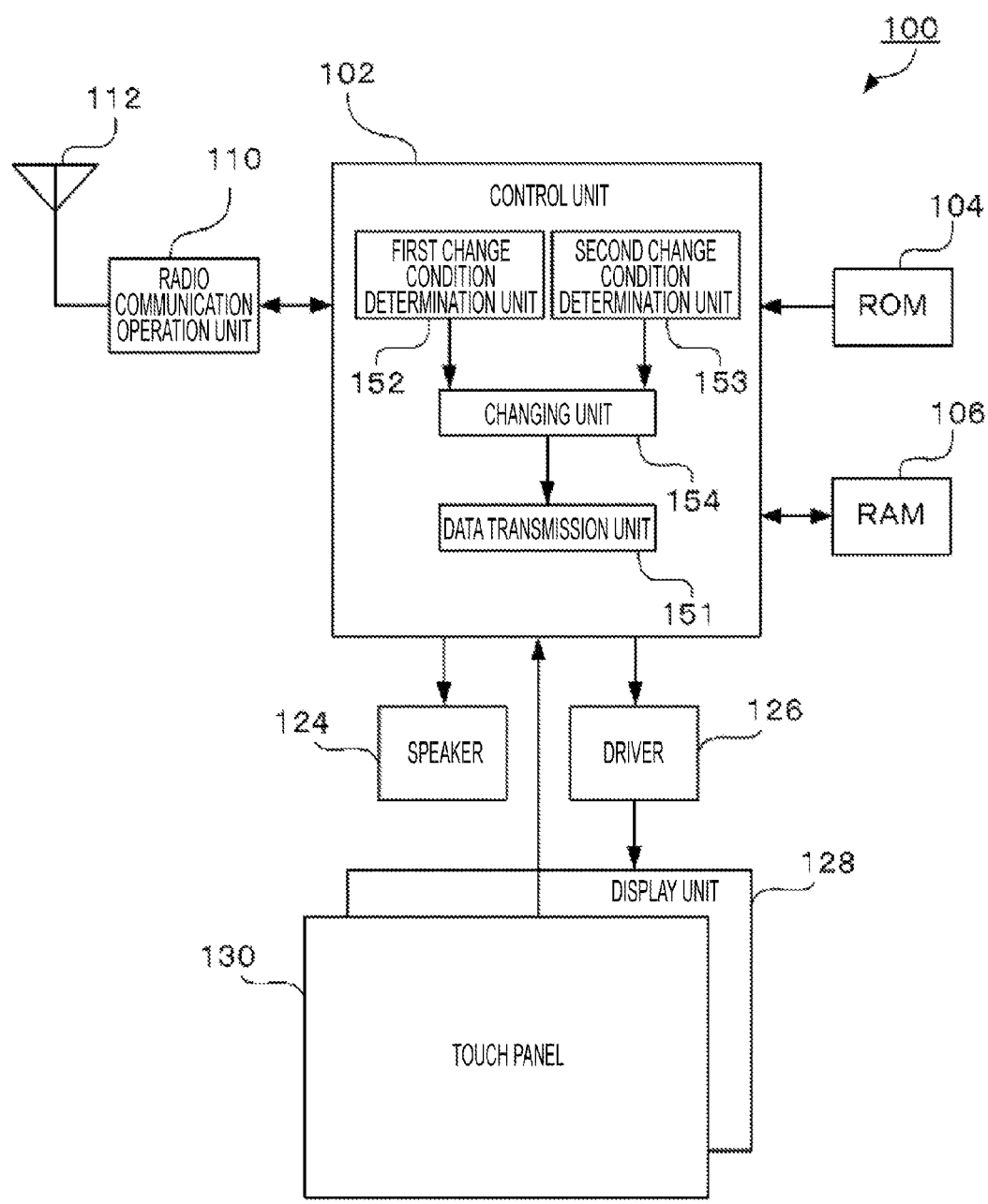
FIG. 2 is a view illustrating a configuration example of a communication terminal as an example of a radio communication apparatus according to the embodiment of the present invention.

FIG. 2 is a block diagram schematically illustrating a configuration example of the communication terminal 100 according to the present embodiment. As illustrated in FIG. 2, the communication terminal 100 includes a control unit 102, read only memory (ROM) 104, random access memory (RAM) 106, a radio communication operation unit 110, an antenna 112, a speaker 124, a driver 126, a display unit 128, and a touch panel 130.

Figure 4:
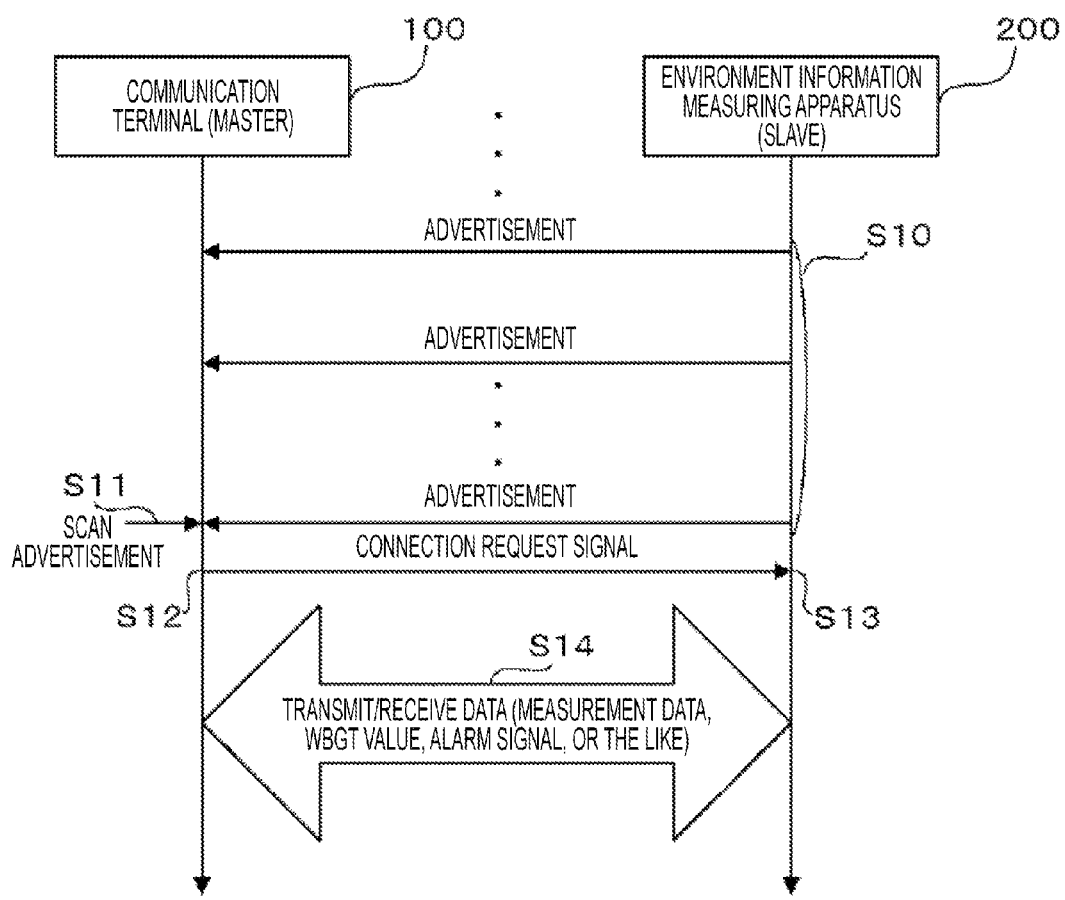
FIG. 4 is a view for describing an operation of the radio communication system in FIG. 1.

The control unit 102 includes, for example, a central processing unit (CPU). According to a program (such as program to realize operation of communication terminal 100 which operation is illustrated in FIG. 4 described later) stored in the ROM 104, the control unit 102 executes software processing, whereby various functions included in the communication terminal 100 is controlled.

The ROM 104 includes non-volatile memory such as flash memory and stores a program or data with which the control unit 102 controls various functions, as described above. The RAM 106 includes volatile memory and is used as a work area where the control unit 102 temporarily stores data to perform various kinds of processing.

The radio communication operation unit 110 is configured, for example, from a radio frequency (RF) circuit or a baseband (BB) circuit and includes transmission circuit and a reception circuit. Each of the transmission circuit and the reception circuit of the radio communication operation unit 110 is switched between an operation state (active) and a stopped state (inactive) by the control unit 102. The radio communication operation unit 110 performs a transmission operation and a reception operation of a radio signal based on the BLE through the antenna 112.

The speaker 124 outputs sound such as an alarm based on sound data from the control unit 102. The driver 126 outputs, to the display unit 128, an image signal which is based on image data output from the control unit 102. The display unit 128 includes, for example, a liquid crystal display (LCD) or an electroluminescence (EL) display. The display unit 128 displays an image (such as image of WBGT value or "alert" which image is illustrated in FIG. 1) according to the image signal output from the driver 126.

The touch panel 130 is an interface which is arranged on an upper surface of the display unit 128 and which is used to input operation contents by a user. The touch panel 130 includes, for example, a transparent electrode (not illustrated). When a finger or the like of a user is in touch, the touch panel 130 detects a position where voltage varies as a contact position and outputs, to the control unit 102, information of the contact position as an input instruction.

Next, a main functional configuration of the control unit 102 of the communication terminal 100 will be described. As illustrated in FIG. 2, the control unit 102 functions as a data transmission unit 151 (second data transmission unit), a first change condition determination unit 152, a second change condition determination unit 153, and a changing unit 154.

After connection between the communication terminal 100 and the environment information measuring apparatus 200 is established, the data transmission unit 151 brings the transmission circuit of the radio communication operation unit 110 into the operation state at timing of a connection event which is timing to transmit data and transmits, to the environment information measuring apparatus 200, data including a latency_off value (specific information) indicating the number of times of latency_off (specific number of times) such as once. The number of times of latency_off is the number of times equal to or smaller than the number of times of latency which will be described later. After transmitting data, the data transmission unit 151 brings the transmission circuit of the radio communication operation unit 110 into the stopped state. Then, at timing of a connection event after a period of a connection event interval which is a period not to transmit data, the data transmission unit 151 transmits data in a manner similar to what has been described above. The data transmission unit 151 repeatedly and intermittently executes the data transmission at the connection event intervals.

The first change condition determination unit 152 determines whether a first change condition to reduce the number of times of latency_off is satisfied. In the present embodiment, the first change condition is, for example, to be in a first period, such as one minute, after operation on the touch panel 130 performed by a user is detected. Note that the first change condition is not limited to the above condition. For example, the first change condition may be selection of a display item indicating that a quick response is necessary based on operation on the touch panel 130 performed by a user.

The second change condition determination unit 153 determines whether a second change condition to increase the number of times of latency_off is satisfied. In the present embodiment, the second change condition is, for example, that a second period such as three minutes has passed after operation on the touch panel 130 by a user is detected. Note that the second change condition is not limited to the above condition. For example, the second change condition may be selection of a display item indicating that a quick response is not necessary based on operation on the touch panel 130 by a user.

When the first change condition determination unit 152 determines that the first change condition is satisfied while data is intermittently transmitted from the data transmission unit 151, the changing unit 154 changes a latency_off value indicating the number of times of latency_off such as once into a latency_off value indicating the number of times of latency_off such as zero. Note that the number of times of latency_off may be changed, for example, from twice to once or from twice to zero. Also, when the second change condition determination unit 153 determines that second change condition is satisfied while data is intermittently transmitted from the data transmission unit 151, for example, the changing unit 154 changes a latency_off value indicating the number of times of latency_off such as zero into a latency_off value indicating the number of times of latency_off such as once. Note that the number of times of latency_off may be changed, for example, from once to twice or from zero to twice. When a latency_off value is changed by the changing unit 154, data including the latency_off value after the change is intermittently transmitted to the environment information measuring apparatus 200 by the data transmission unit 151.

Figure 3:
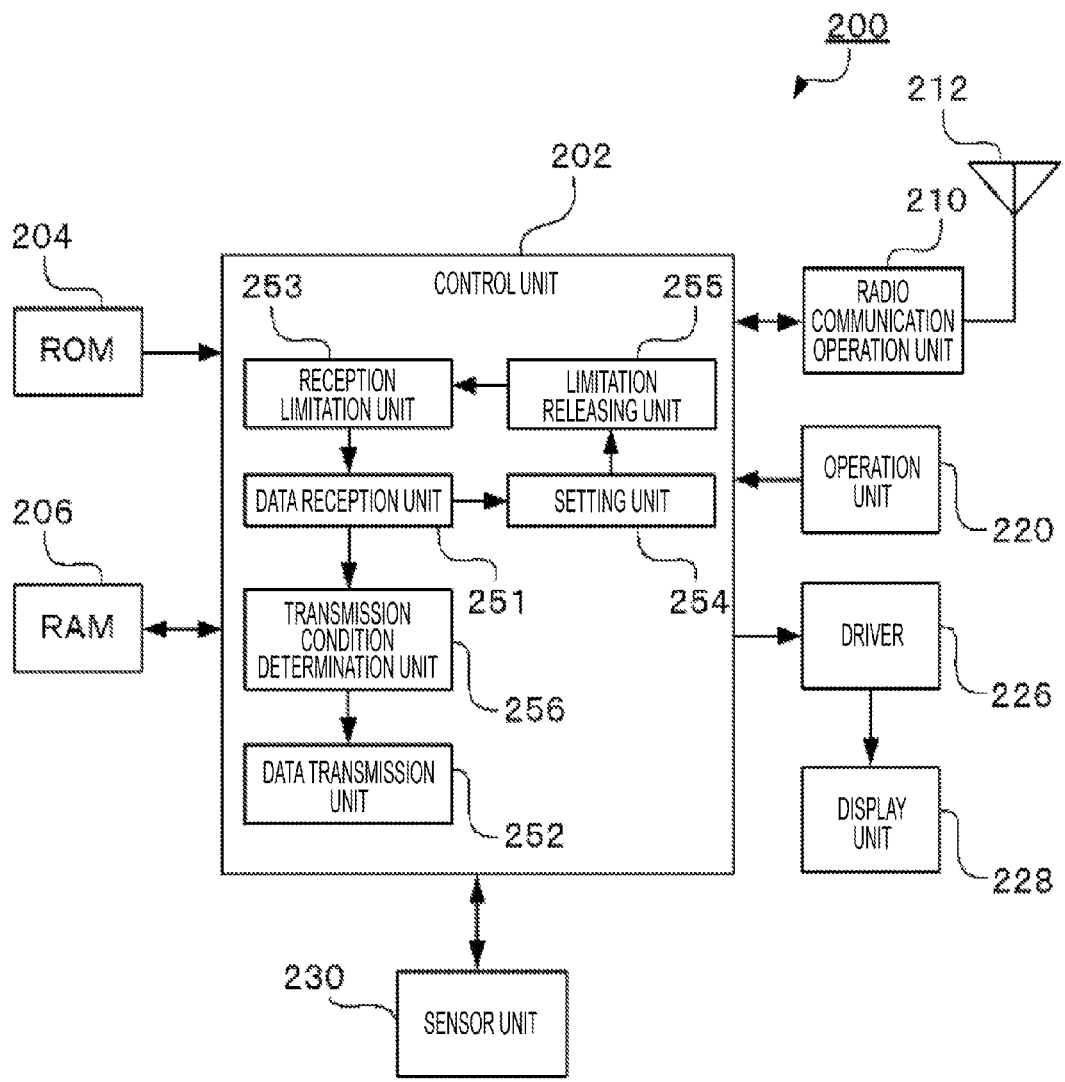
FIG. 3 is a view illustrating a configuration example of an environment information measuring apparatus as an example of a radio communication apparatus according to the embodiment of the present invention.

FIG. 3 is a block diagram schematically illustrating a configuration example of the environment information measuring apparatus 200 according to the present embodiment. As illustrated in FIG. 3, the environment information measuring apparatus 200 includes a control unit 202, ROM 204, RAM 206, a radio communication operation unit 210, an antenna 212, an operation unit 220, a driver 226, a display unit 228, and a sensor unit 230.

The control unit 202 includes, for example, a CPU. By executing software processing according to a program (such as program to realize operation of environment information measuring apparatus 200 which operation is illustrated in FIG. 4 described later) stored in the ROM 204, the control unit 202 controls various functions included in the environment information measuring apparatus 200.

The ROM 204 includes non-volatile memory such as flash memory and stores a program or data used by the control unit 202 to control various functions, as described above. The RAM 206 includes volatile memory and is used as a work area where the control unit 202 temporarily stores data to perform various kinds of processing.

The radio communication operation unit 210 is configured, for example, from a radio frequency (RF) circuit or a baseband (BB) circuit and includes a transmission circuit and a reception circuit. Each of the transmission circuit and the reception circuit of the radio communication operation unit 210 is switched between an operation state and a stopped state by the control unit 202. The radio communication operation unit 210 performs a transmission operation and a reception operation of a radio signal based on the BLE through the antenna 212.

The operation unit 220 includes, for example, a switch and is used to input operation contents such as turning on/off of a power source performed by a user.

The driver 226 outputs, to the display unit 228, an image signal which is based on image data output from the control unit 202. The display unit 228 includes, for example, an LCD or an EL display. The display unit 228 displays an image (such as image indicating numeric value such as temperature, relative humidity, WBGT value as illustrated in FIG. 1) according to the image signal output from the driver 226.

The sensor unit 230 includes a temperature sensor including, for example, a resistance temperature detector or a thermocouple and humidity sensor including, for example, a polymer membrane. The temperature sensor measures a temperature around the environment information measuring apparatus 200, that is, a temperature of a place where the environment information measuring apparatus 200 is installed and transmits data indicating a measurement result to the control unit 202. The humidity sensor measures relative humidity around the environment information measuring apparatus 200, that is, relative humidity of a place where the environment information measuring apparatus 200 is installed and transmits data indicating the measurement result to the control unit 202.

Next, a main functional configuration of the control unit 202 of the environment information measuring apparatus 200 will be described. As illustrated in FIG. 3, the control unit 202 functions as a data reception unit 251, a data transmission unit 252 (first data transmission unit), a reception limitation unit 253, a setting unit 254, a limitation releasing unit 255, and a transmission condition determination unit 256.

After connection between the communication terminal 100 and the environment information measuring apparatus 200 is established, the data reception unit 251 brings the reception circuit of the radio communication operation unit 210 into the operation state at timing of a connection event, at which timing the communication terminal 100 transmits data, and receives the data transmitted from the communication terminal 100. After receiving the data, the data reception unit 251 brings the reception circuit of the radio communication operation unit 210 into the stopped state. Then, the data reception unit 251 receives data in a manner similar to what has been described above at timing of a connection event which is next timing at which the communication terminal 100 transmits data. The data reception unit 251 repeatedly and intermittently executes the data reception at the connection event intervals. Note that as described later, it is not possible for the data reception unit 251 to receive data while reception of the data is limited by the reception limitation unit 253.

After the data is received by the data reception unit 251, the data transmission unit 252 brings the transmission circuit of the radio communication operation unit 210 into the operation state and transmits data to the communication terminal 100. After transmitting data, the data transmission unit 252 brings the transmission circuit of the radio communication operation unit 210 into the stopped state. Note that as described later, when the transmission condition determination unit 256 determines that a transmission condition of data is not satisfied, it is not possible for the data transmission unit 252 to transmit data to the communication terminal 100.

Until the number of times of transmission of the data which is intermittently transmitted from the communication terminal 100 reaches number of times of latency (number of times of limitation) set by the control unit 202, the reception limitation unit 253 limits reception of data performed by the data reception unit 251. The number of times of latency is the number of times determined by the control unit 202 within a range of the number of times of latency (such as twice) indicated by a latency value included in a connection request signal transmitted from the communication terminal 100 during connection between the communication terminal 100 and the environment information measuring apparatus 200 and is the number of times that the control unit 202 limits reception of the data intermittently transmitted from the communication terminal 100. The number of times of latency is set by the control unit 202, for example, when a latency counter value is stored into a latency counter provided in a predetermined region of the RAM 206. In the present embodiment, for example, the reception limitation unit 253 decrements (subtract one from) the latency counter value stored in the latency counter at timing of each connection event and performs control in such a manner that data transmitted from the communication terminal 100 is not received until the latency counter value becomes "0".

By reading a latency_off value which is included in the data received by the data reception unit 251 and which indicates the number of times of latency_off and, for example, by storing a latency_off counter value into a latency_off counter provided in a predetermined region of the RAM 206 based on the latency_off value, the setting unit 254 sets the number of times of latency_off (specific number of times). The number of times of latency_off is the number of times used to release the limitation performed by the reception limitation unit 253 (limitation of data reception performed by data reception unit 251).

When the number of times of transmission of the data intermittently transmitted from the communication terminal 100 reaches the number of times of latency_off set by the setting unit 254, the limitation releasing unit 255 releases the limitation performed by the reception limitation unit 253 and makes it possible for the data reception unit 251 to receive the data. Note that although the data reception unit 251 receives the data, data transmission unit 252 does not transmit data unless there is a request from the communication terminal 100. In the present embodiment, for example, the reception limitation unit 253 decrements (subtract one from) the latency_off counter value stored in the latency_off counter at timing of each connection event and releases the limitation performed by the reception limitation unit 253 when the latency_off counter value becomes "0".

Based on the data received by the data reception unit 251, transmission condition determination unit 256 determines whether a transmission condition of data to transmit data to the communication terminal 100 is satisfied. In the present embodiment, for example, a data value of a payload in a packet structure of the data received by the data reception unit 251 is a data value indicating emptiness such as "0", the transmission condition determination unit 256 determines that it is not necessary to transmit data to the communication terminal 100 and that the transmission condition of data is not satisfied. Also, a data value of a payload in the packet structure of the data received by the data reception unit 251 is a data value other than the data value indicating emptiness, the transmission condition determination unit 256 determines that the transmission condition of data is satisfied.

Next, an operation of the radio communication system 1 in the present embodiment will be described with reference to a flowchart in FIG. 4.

As illustrated in FIG. 4, the environment information measuring apparatus 200 intermittently transmits an advertisement to the communication terminal 100 at certain intervals (step S10). The advertisement is identification information used by the environment information measuring apparatus 200 to notify existence of the self to the communication terminal 100 in order to make it possible for the communication terminal 100 to search for the environment information measuring apparatus 200 or for the communication terminal 100 to communicate with the environment information measuring apparatus 200. Note that the advertisement may be also referred to as an "advertise packet", an "advertisement packet", or an "advertising packet". Also, transmission of an advertisement is called "advertise" or "advertising".

The communication terminal 100 executes reception operation processing to receive an advertisement based, for example, on operation on the touch panel 130 performed by a user to measure environment information (step S11). In step S11, the communication terminal 100 scans an advertisement and receives the advertisement transmitted from the environment information measuring apparatus 200. After receiving the advertisement in step S11, the communication terminal 100 executes connection operation processing for connection with the environment information measuring apparatus 200 (step S12). In step S12, the communication terminal 100 transmits a connection request signal to the environment information measuring apparatus 200 after executing processing to add a latency value, a value indicating timing of a connection event, a value indicating a period of a connection event interval, or the like to the connection request signal.

The environment information measuring apparatus 200 executes connection operation processing to receive a connection request signal transmitted from the communication terminal 100 (step S13). After executing the processing in step S13, the environment information measuring apparatus 200 reads the latency value, the value indicating timing of a connection event, the value indicating a period of a connection event interval, or the like included in the received connection request signal and executes, based on the read value, processing of setting a counter or the like to set a counter value or the like in each buffer of a counter or the like provided in a predetermined region of the RAM 206. Accordingly, connection between the communication terminal 100 and the environment information measuring apparatus 200 is established.

After the processing in step S12 and step S13 is executed and the connection between the communication terminal 100 and the environment information measuring apparatus 200 is established, transmission/reception of data is performed between the communication terminal 100 and the environment information measuring apparatus 200 (step S14). By the transmission/reception of data in step S14, data such as temperature, relative humidity, or a WBGT value or an alarm signal is transmitted from the environment information measuring apparatus 200 to the communication terminal 100.

Here, transmission/reception of data, in a related art, which is performed between the communication terminal 100 and the environment information measuring apparatus 200 in step S14 will be described in detail.

Figure 5:
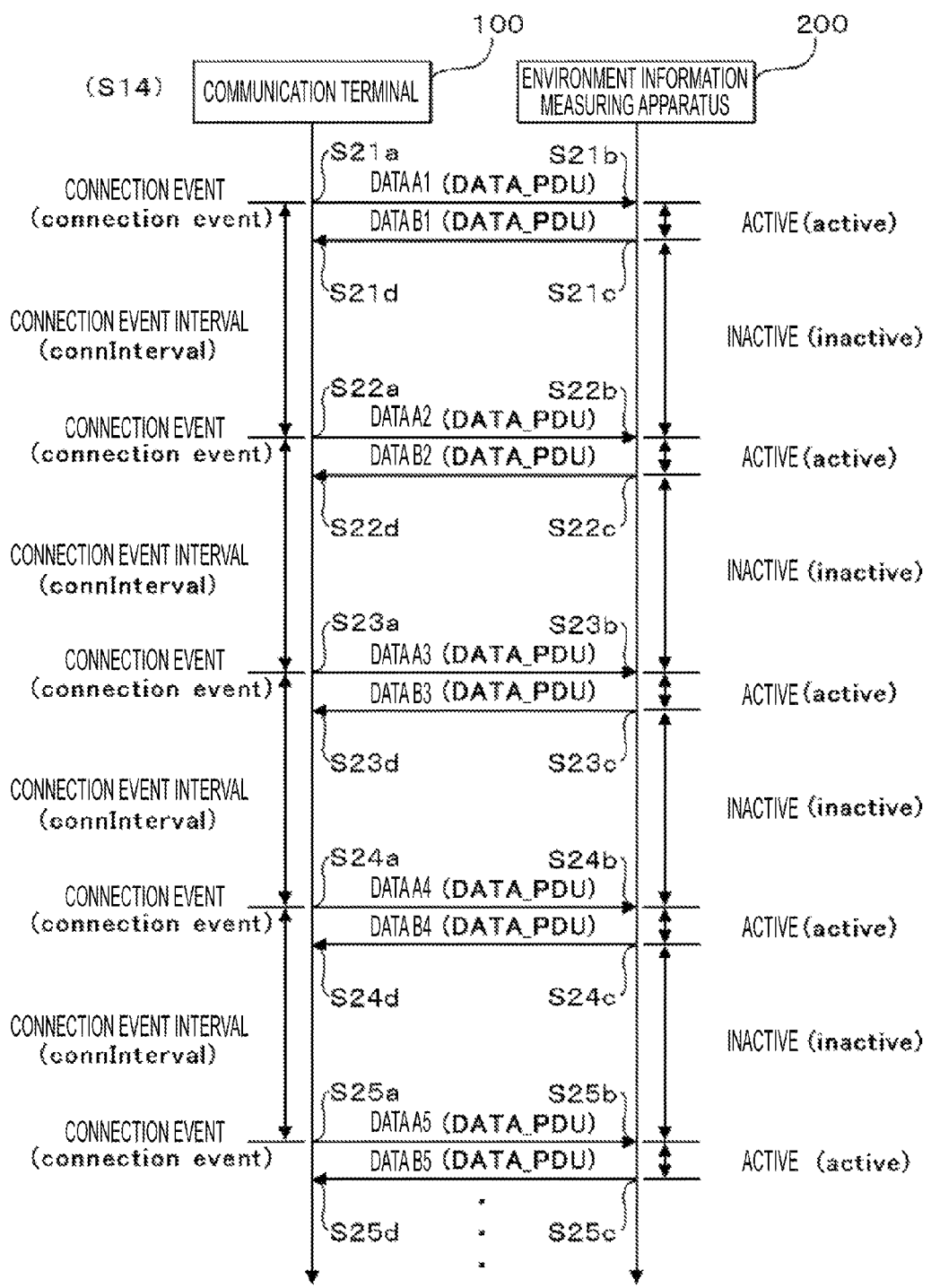
FIG. 5 is a view illustrating an operation of data transmission/reception in the radio communication system in FIG. 1.

FIG. 5 is a view illustrating an operation of transmission/reception of data in step S14. As illustrated in FIG. 5, in step S14, the communication terminal 100 transmits data A1 (DATA_PDU) to the environment information measuring apparatus 200 at timing of a connection event (step S21a).

Also, the environment information measuring apparatus 200 receives the data A1 transmitted from the communication terminal 100 at timing of a connection event (step S21b). After receiving the data A1, the environment information measuring apparatus 200 transmits data B1 (DATA_PDU) to the communication terminal 100 (step S21c). The communication terminal 100 receives the data B1, which is transmitted from the environment information measuring apparatus 200, at the timing at which the environment information measuring apparatus 200 transmits the data B1 (step S21d).

From when the environment information measuring apparatus 200 starts the processing in step S21b (when reception of data A1 is started) and until when the environment information measuring apparatus 200 ends the processing in step S21c (when transmission of data B1 is ended), each of the transmission circuit and the reception circuit of the radio communication operation unit 110 of the environment information measuring apparatus 200 becomes active. After the environment information measuring apparatus 200 ends the processing in step S21c (after transmission of data B1 is ended), each of the transmission circuit and the reception circuit of the radio communication operation unit 110 of the environment information measuring apparatus 200 becomes inactive.

Note that from when the environment information measuring apparatus 200 starts processing in step S22b, S23b, S24b, S25b . . . which will be described later and until when the environment information measuring apparatus 200 ends processing in step S22c, S23c, S24c, S25c . . . , each of the transmission circuit and the reception circuit of the radio communication operation unit 110 of the environment information measuring apparatus 200 becomes active. Also, after the environment information measuring apparatus 200 ends the processing in step S22c, S23c, S24c, S25c . . . , each of the transmission circuit and the reception circuit of the radio communication operation unit 110 of the environment information measuring apparatus 200 becomes inactive.

At timing of a connection event after a period of a connection event interval (ConnInterval) passes from timing of a connection event, the communication terminal 100 transmits data A2 to the environment information measuring apparatus 200 (step S22a). Also, the environment information measuring apparatus 200 receives, at the timing of the connection event, the data A2 transmitted from the communication terminal 100 (step S22b). After receiving the data A2, the environment information measuring apparatus 200 transmits data B2 to the communication terminal 100 (step S22c). The communication terminal 100 receives the data B2, which is transmitted from the environment information measuring apparatus 200, at the timing at which the environment information measuring apparatus 200 transmits the data B2 (step S22d). In such a manner, the communication terminal 100 and the environment information measuring apparatus 200 repeatedly execute the above operations (step S23, step S24, step S25 . . . ) and intermittently perform transmission/reception of data A3, A4, A5 . . . , and data B3, B4, B5 . . . at certain intervals.

Also, in step S14, there is a case where control called a slave latency operation (also referred to as "latency operation" or "latency") is performed in the environment information measuring apparatus 200. The slave latency operation is control (to limit reception) in which the environment information measuring apparatus 200 does not receive data successively, which is intermittently transmitted from the communication terminal 100, within a range of the number of times of latency indicated by a latency value included in the connection request signal received during the connection operation processing in step S12. The slave latency operation is set and executed, for example, when an amount of remaining battery in the environment information measuring apparatus 200 becomes small. By the slave latency operation, power consumption of the environment information measuring apparatus 200 can be controlled.

Figure 6:
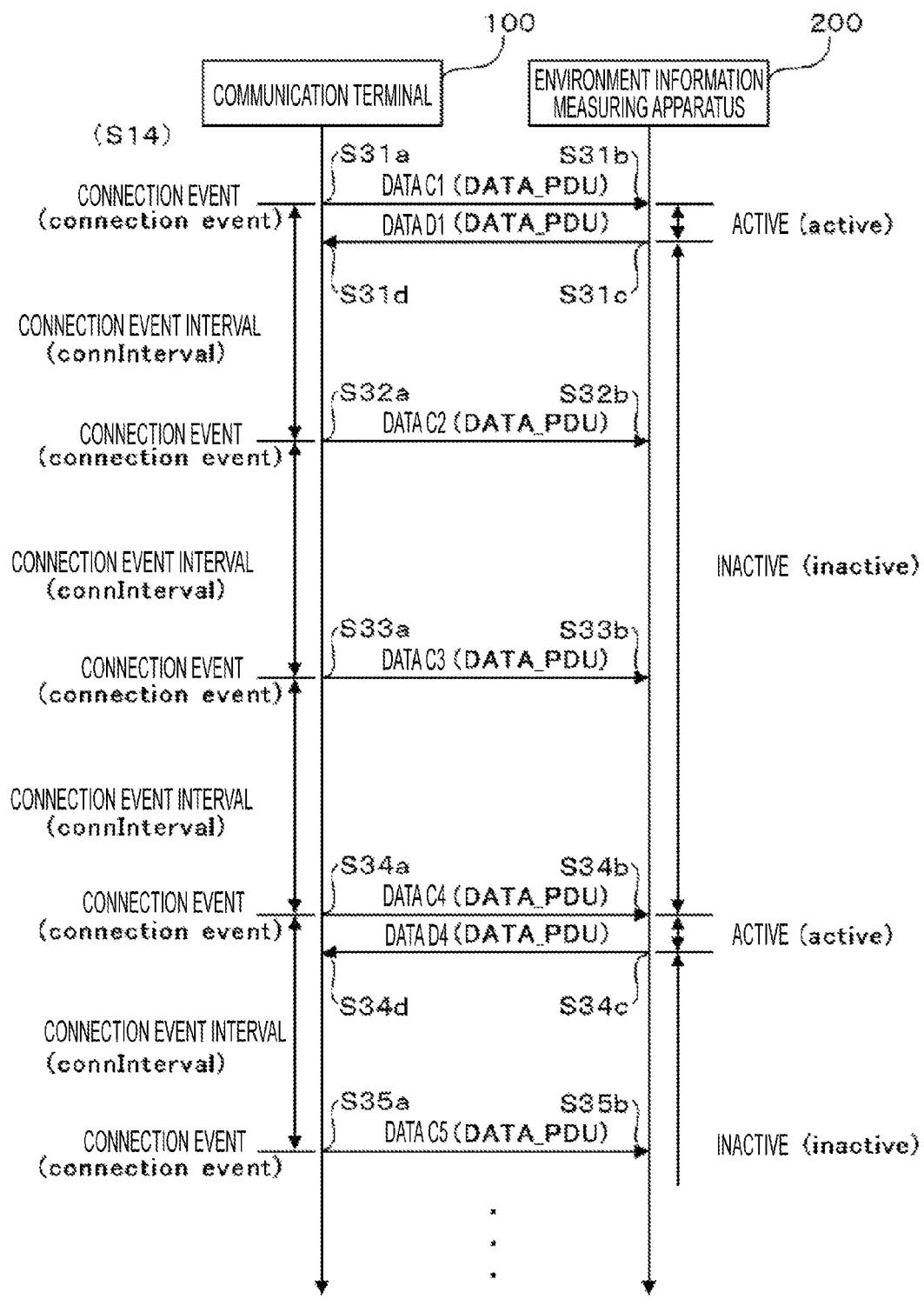
FIG. 6 is a view illustrating the operation of the data transmission/reception of the radio communication system in FIG. 1.

FIG. 6 is a view illustrating an operation of transmission/reception of data in which a slave latency operation in a related art is executed in step S14. Note that in FIG. 6, a case where a slave latency operation in which data is not received twice successively (slave latency operation in which number of times of latency is twice) is executed is illustrated. As illustrated in FIG. 6, in step S14, the communication terminal 100 transmits data C1 (DATA_PDU) to the environment information measuring apparatus 200 at timing of a connection event (step S31a).

Also, the environment information measuring apparatus 200 receives, at the timing of the connection event, the data C1 transmitted from the communication terminal 100 (step S31b). After receiving the data C1, the environment information measuring apparatus 200 transmits data D1 (DATA_PDU) to the communication terminal 100 (step S31c). The communication terminal 100 receives the data D1, which is transmitted from the environment information measuring apparatus 200, at the timing at which the environment information measuring apparatus 200 transmits the data D1 (step S31d).

From when the environment information measuring apparatus 200 starts the processing in step S31b (when reception of data C1 is started) until when the environment information measuring apparatus 200 ends the processing in step S31c (when transmission of data D1 is ended), each of the transmission circuit and the reception circuit of the radio communication operation unit 110 of the environment information measuring apparatus 200 becomes active. After the environment information measuring apparatus 200 ends the processing in step S31c (after transmission of data D1 is ended), each of the transmission circuit and the reception circuit of the radio communication operation unit 110 of the environment information measuring apparatus 200 becomes inactive.

Note that from when the environment information measuring apparatus 200 starts processing in step S34b which will be described later and until when the environment information measuring apparatus 200 ends processing in step S34c, each of the transmission circuit and the reception circuit of the radio communication operation unit 110 of the environment information measuring apparatus 200 also becomes active. Also, after the environment information measuring apparatus 200 ends the processing in step S34c, each of the transmission circuit and the reception circuit of the radio communication operation unit 110 of the environment information measuring apparatus 200 becomes inactive.

The communication terminal 100 transmits data C2 to the environment information measuring apparatus 200 at timing of a connection event after a period of a connection event interval passes from timing of a connection event (step S32a). Due to the slave latency operation, the environment information measuring apparatus 200 does not receive the data C2 transmitted from the communication terminal 100 (step S32b). Note that the environment information measuring apparatus 200 does not transmit data to the communication terminal 100 since the environment information measuring apparatus 200 does not receive the data C2. Thus, the communication terminal 100 does not receive data from the environment information measuring apparatus 200.

The communication terminal 100 transmits data C3 to the environment information measuring apparatus 200 at timing of a connection event after a period of a connection event interval further passes from the timing of the connection event (step S33a). Due to the slave latency operation, the environment information measuring apparatus 200 does not receive the data C3 transmitted from the communication terminal 100 (step S33b).

The communication terminal 100 transmits data C4 to the environment information measuring apparatus 200 at timing of a connection event after a period of a connection event interval further passes from the timing of the connection event (step S34a). Also, the environment information measuring apparatus 200 receives, at the timing of the connection event, the data C4 transmitted from the communication terminal 100 (step S34b). After receiving the data C4, the environment information measuring apparatus 200 transmits data D4 to the communication terminal 100 (step S34c). The communication terminal 100 receives the data D4, which is transmitted from the environment information measuring apparatus 200, at the timing at which the environment information measuring apparatus 200 transmits the data D4 (step S34d).

The communication terminal 100 transmits data C5 to the environment information measuring apparatus 200 at timing of a connection event after a period of a connection event interval further passes from the timing of the connection event (step S35a). Due to the slave latency operation, the environment information measuring apparatus 200 does not receive the data C5 transmitted from the communication terminal 100 (step S35b). In such a manner, the communication terminal 100 and the environment information measuring apparatus 200 repeatedly execute the above operations and perform transmission/reception of data.

Figure 7:
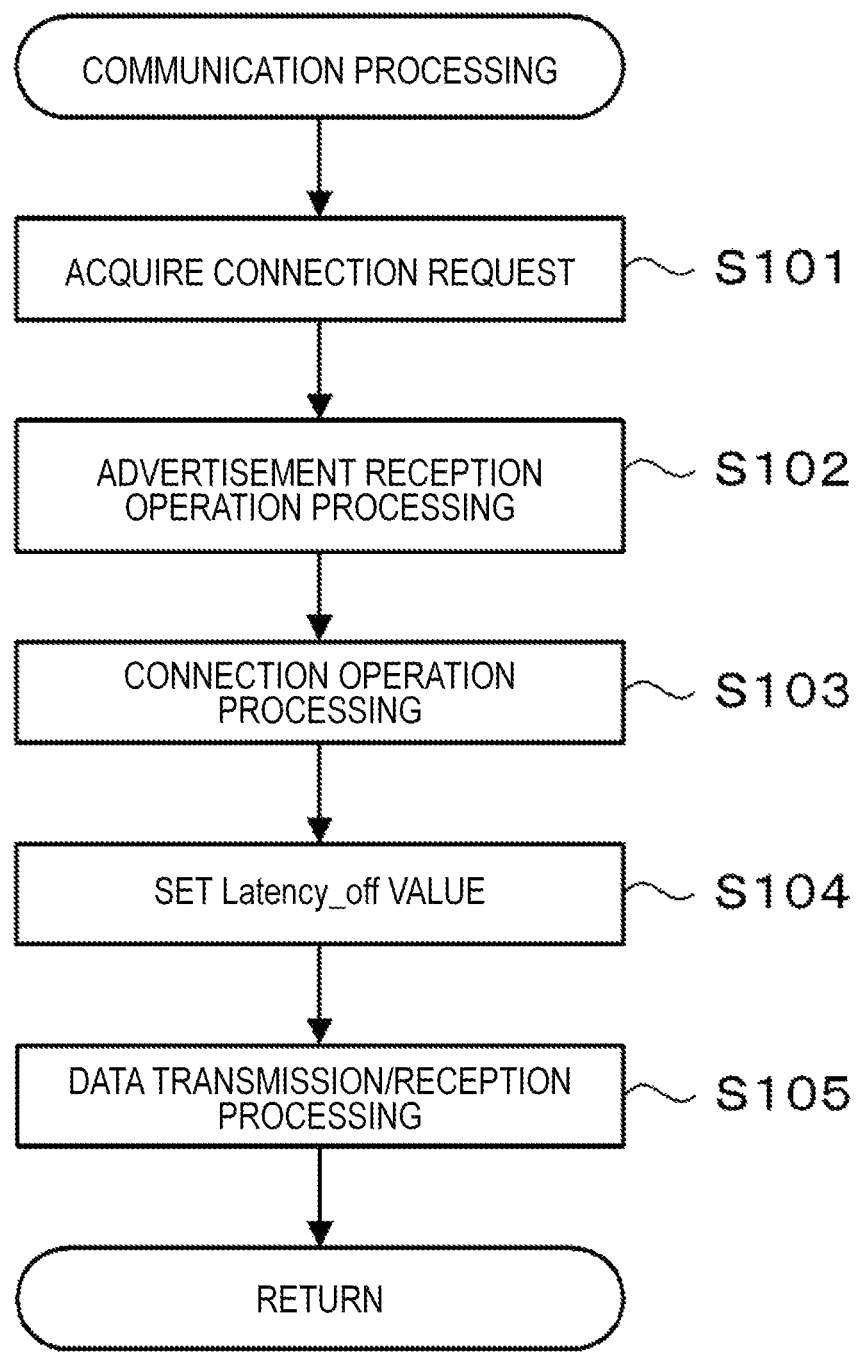
FIG. 7 is a flowchart illustrating an example of communication processing executed by the communication terminal in FIG. 2.

Next, an operation of the communication terminal 100 according to the present embodiment will be described with reference to FIG. 7. FIG. 7 is a flowchart illustrating an example of communication processing executed by the control unit 102 of the communication terminal 100 according to the present embodiment. Note that the communication processing is performed by the control unit 102 to read and execute a program previously stored in the ROM 104.

The control unit 102 of the communication terminal 100 starts the communication processing illustrated in FIG. 7, for example, after an application for measuring environment information is activated.

First, for example, the control unit 102 acquires operation on the touch panel 130 performed by a user to measure environment information as a request for connection with the environment information measuring apparatus 200 (step S101).

The control unit 102 executes advertisement reception operation processing to receive an advertisement (step S102). In step S102, for example, the control unit 102 scans an advertisement and determines whether the advertisement transmitted from the environment information measuring apparatus 200 is received. When it is determined that the advertisement is not received, an advertisement is scanned again after a predetermined polling cycle passes. The control unit 102 repeatedly performs the above operation until an advertisement is received.

After executing the processing in step S102, the control unit 102 executes connection operation processing for connection with the environment information measuring apparatus 200 (step S103). In step S103, after performing processing to add a latency value, a value indicating timing of a connection event, a value indicating a period of a connection event interval, or the like to a connection request signal, the control unit 102 transmits the connection request signal to the environment information measuring apparatus 200. In such a manner, the control unit 102 functions as a latency designating unit (transmission/reception unnecessity designating unit) to designate latency (unnecessity of transmission/reception) by transmitting, to the environment information measuring apparatus 200, the connection request signal including, for example, a latency value indicating the number of times of latency. In the present embodiment, for example, a latency value is a value such as "010 (three bit)" indicating twice as the number of times of latency. Note that the latency value is not limited to the value indicating twice as the number of times of latency and may be a value indicating once or three times or more. Note that, for example, a latency value update signal including a changed latency value may be transmitted to the environment information measuring apparatus 200 when operation to update a latency value is performed by a user during execution of the data transmission/reception processing in step S105 which will be described later.

After executing the processing in step S103, the control unit 102 sets (store) "000 (three bit)" as a latency_off value added to data to be transmitted to the environment information measuring apparatus 200, for example, in a latency_off buffer provided in the RAM 106 (step S104).

Figures 8A, 8B:
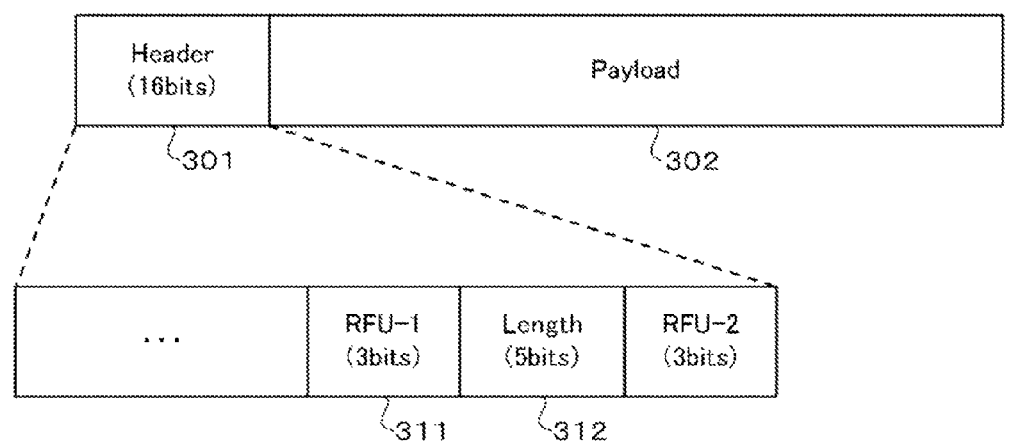
FIG. 8A and FIG. 8B are views illustrating a packet structure of data and a setting example of a latency_off value.

Here, a packet structure of data transmitted from the communication terminal 100 will be described. FIG. 8A is a view illustrating a packet structure of data. The data includes a header 301 having 16 bits and a payload 302 to store a data value. The header 301 includes a field 311 (RFU-1) having three bits and a field 312 (Length) having five bits. The field 311 (RFU-1) is a region to store a latency_off value. The field 312 is a region to store a data value indicating a bit length of a data value stored in the payload 302. Note that the header 301 includes a field (RFU-2) having three bits. The field (RFU-2) may be a region to store the latency_off value. Also, both of the field 311 (RFU-1) and the field (RFU-2) may be regions to store the latency_off value.

FIG. 8B is a view illustrating an example of setting a latency_off value. In the present embodiment, as illustrated in FIG. 8B, three latency_off values which are "000 (three bit)", "001 (three bit)", and "010 (three bit)" are prepared. For example, "000 (three bit)" is a value indicating zero as the number of times of latency_off. Also, "001 (three bit)" is a value indicating once as the number of times of latency_off and "010 (three bit)" is a value indicating twice as the number of times of latency_off. Note that the number of times of latency_off is not limited to zero to twice and may be three times or more. In this case, latency_off values such as "011 (three bit)", "100 (three bit)", "101 (three bit)" . . . are prepared. When data is transmitted in data transmission/reception processing in step S105 described later, the latency_off value set in the latency_off buffer provided in the RAM 106 is stored in the field 311 of the data. Note that by the processing in step S104, "000 (three bit)" is set as a latency_off value in the latency_off buffer.

Thus, in the field 311 of data transmitted right after activation, "000 (three bit)" is stored.

Figure 9:
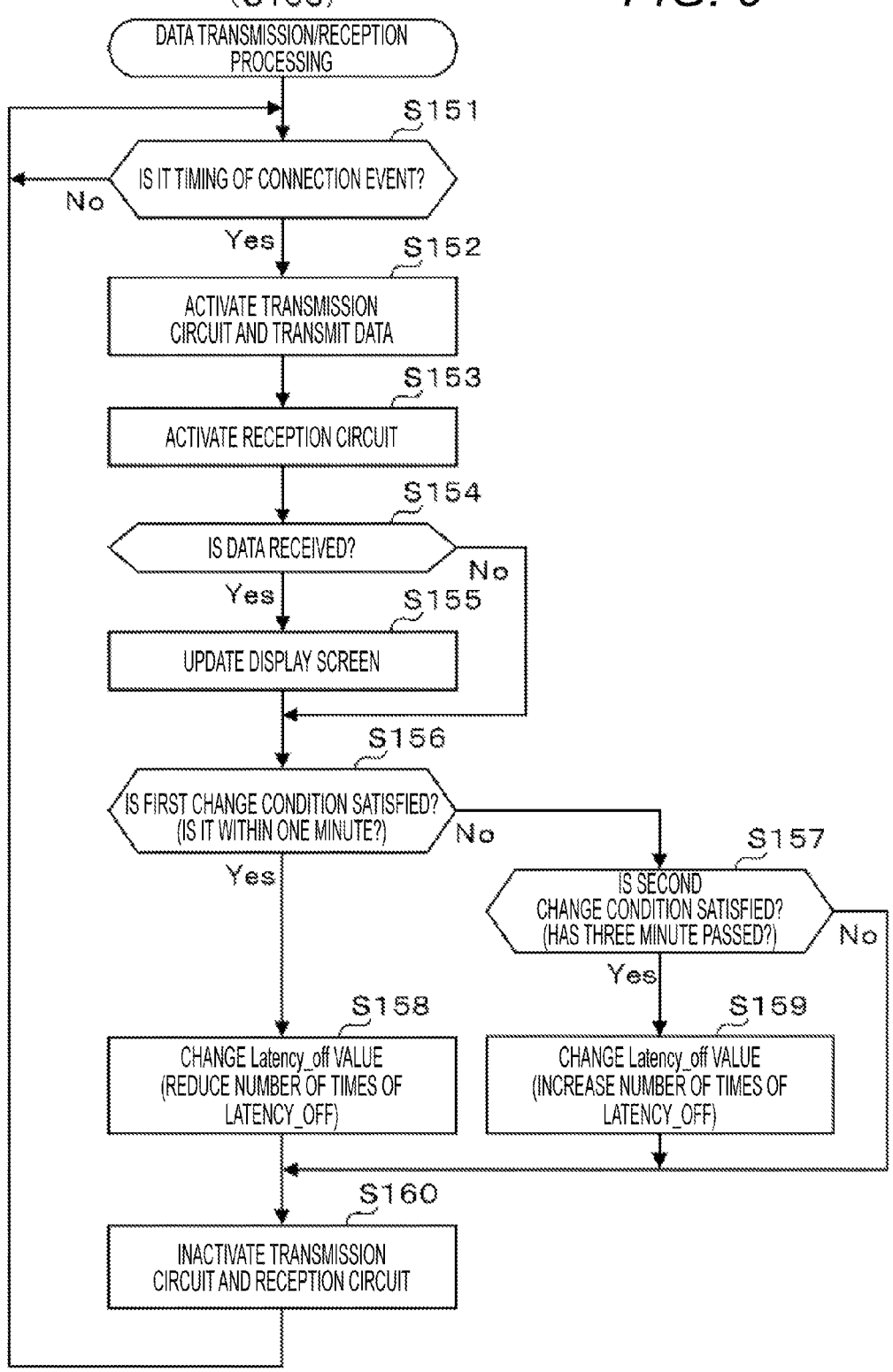
FIG. 9 is a flowchart illustrating an example of data transmission/reception processing executed by the communication terminal in FIG. 2.

After executing the processing in step S104, the control unit 102 executes data transmission/reception processing (step S105). FIG. 9 is a flowchart illustrating an example of the data transmission/reception processing in step S105 illustrated in FIG. 7.

As illustrated in FIG. 9, first, the control unit 102 determines whether it is timing of a connection event (step S151). When it is determined in step S151 that it is not the timing of a connection event (step S151; No), the control unit 102 repeatedly executes the processing in step S151 until it becomes the timing of a connection event.

When it is determined in step S151 that it is the timing of a connection event (step S151; Yes), the control unit 102 which functions as the data transmission unit 151 (reception control information transmission unit) activates the transmission circuit of the radio communication operation unit 110 and transmits data including a latency_off value to the environment information measuring apparatus 200 (step S152). Note that in step S152, the control unit 102 stores a latency_off value set in the latency_off buffer provided in the RAM 106 into the field 311 of the data and transmits the data. In such a manner, the control unit 102 transmits, to the environment information measuring apparatus 200, a latency_off value which is information to control reception during latency along with a different data value.

Next, the control unit 102 activates the reception circuit of the radio communication operation unit 110 (step S153). In step S153, the control unit 102 receives data when the environment information measuring apparatus 200 transmits the data.

After executing the processing in step S153, the control unit 102 determines whether the data transmitted from the environment information measuring apparatus 200 is received (step S154). When it is determined in step S154 that the data is received (step S154; Yes), the control unit 102 updates a display screen of the display unit 128 (step S155). In step S155, for example, the control unit 102 displays, on the display screen of the display unit 128, an image such as a WBGT value "25° C." or "alert" as illustrated in FIG. 1. Note that when an image such as a WBGT value "25° C." or "alert" is already displayed on the display screen of the display unit 128, an image such as "no change" may be further displayed.

After executing the processing in step S155 or when it is determined in step S154 that the data is not received (step S154; No), the control unit 102 which functions as the first change condition determination unit 152 determines whether a first change condition is satisfied (step S156). In step S156, for example, in a case where it is within a first period, such as one minute, after operation on the touch panel 130 by a user is detected, the control unit 102 determines that the first change condition is satisfied, that is, a quick response is necessary. When it is determined in step S156 that the first change condition is satisfied (step S156; Yes), a control unit 102 which functions as the changing unit 154 changes the latency_off value set in the latency_off buffer provided in the RAM 106 and reduces the number of times of latency_off (step S158).

In step S158, when the latency_off value set in the latency_off buffer is the latency_off value "010 (three bit)" indicating twice as the number of times of latency_off, the control unit 102 overwrites the latency_off buffer with the latency_off value "001 (three bit)" indicating once as the number of times of latency_off. Accordingly, the latency_off value is changed. Also, when the latency_off value set in the latency_off buffer is the latency_off value "001 (three bit)" indicating once as the number of times of latency_off, the control unit 102 overwrites the latency_off buffer with the latency_off value "000 (three bit)" indicating zero as the number of times of latency_off. Accordingly, the latency_off value is changed. Also, when the latency_off value set in the latency_off buffer is the latency_off value "000 (three bit)" indicating zero as the number of times of latency_off, the control unit 102 keeps the latency_off value set in the latency_off buffer.

Note that in step S158, when the latency_off value set in the latency_off buffer is the latency_off value "010 (three bit)" indicating twice as the number of times of latency_off, a change into the latency_off value "000 (three bit)" indicating zero as the number of times of latency_off may be performed.

When it is determined in step S156 that the first change condition is not satisfied (step S156; No), the control unit 102 which functions as the second change condition determination unit 153 determines whether the second change condition is satisfied (step S157). In step S157, for example, when a second period, such as three minutes, passes after operation on the touch panel 130 by a user is detected, the control unit 102 determines that the second change condition is satisfied, that is, it is necessary to increase the number of times of latency_off and to control power consumption.

When it is determined in step S157 that the second change condition is satisfied (step S157; Yes), the control unit 102 which functions as the changing unit 154 changes the latency_off value set in the latency_off buffer provided in the RAM 106 and increases the number of times of latency_off (step S159).

In step S159, when the latency_off value set in the latency_off buffer is the latency_off value "000 (three bit)" indicating zero as the number of times of latency_off, the control unit 102 overwrites the latency_off buffer with the latency_off value "001 (three bit)" indicating once as the number of times of latency_off. Accordingly, the latency_off value is changed. Also, when the latency_off value set in the latency_off buffer is the latency_off value "001 (three bit)" indicating once as the number of times of latency_off, the control unit 102 overwrites the latency_off buffer with the latency_off value "010 (three bit)" indicating twice as the number of times of latency_off. Accordingly, the latency_off value is changed. Also, when the latency_off value set in the latency_off buffer is the latency_off value "010 (three bit)" indicating twice as the number of times of latency_off, the control unit 102 keeps the latency_off value set in the latency_off buffer.

Note that when the latency_off value set in the latency_off buffer in step S159 is the latency_off value "000 (three bit)" indicating zero as the number of times of latency_off, a change into the latency_off value "010 (three bit)" indicating twice as the number of times of latency_off may be performed.

After executing the processing in step S158 and in step S159 or when it is determined in step S157 that the second change condition is not satisfied (step S157; No), the control unit 102 inactivates the transmission circuit and the reception circuit of the radio communication operation unit 110 (step S160). After executing the processing in step S160, the control unit 102 executes the processing in step S151.

Note that the data transmission/reception processing in step S105 is ended, for example, when disconnection is selected by operation on the touch panel 130 performed by a user or when selection to end the application for measuring environment information is performed. After the processing in step S105 is executed, the control unit 102 ends the communication processing.

Figure 10:
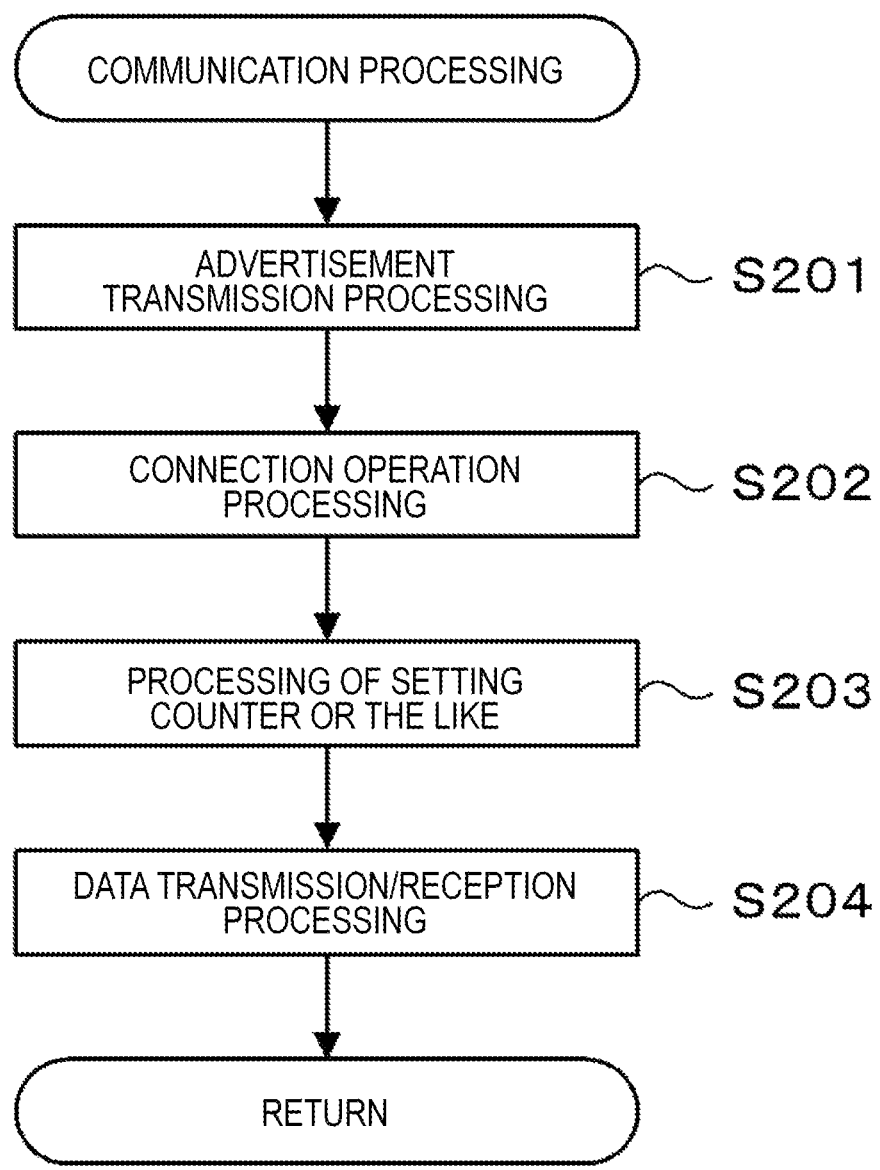
FIG. 10 is a flowchart illustrating an example of communication processing executed by the environment information measuring apparatus in FIG. 3.

Next, an operation of the environment information measuring apparatus 200 according to the present embodiment will be described with reference to FIG. 10. FIG. 10 is a flowchart illustrating an example of the communication processing executed by the control unit 202 of the environment information measuring apparatus 200 according to the present embodiment. Note that the communication processing is performed by the control unit 202 to read and execute a program previously stored in the ROM 204.

The control unit 202 of the environment information measuring apparatus 200 starts the communication processing illustrated in FIG. 10, for example, after a power source is turned on by operation in the operation unit 220 performed by a user.

First, the control unit 202 executes advertisement transmission processing to perform advertising to intermittently transmit an advertisement to the communication terminal 100 at certain intervals (step S201). After executing the processing in step S201, the control unit 202 executes connection operation processing to receive a connection request signal transmitted from the communication terminal 100 (step S202). After executing the processing in step S202, the control unit 102 reads a latency value, a value indicating timing of a connection event, a value indicating a period of a connection event interval, or the like included in the connection request signal received in step S202. Based on the read value, the control unit 102 executes processing of setting a counter or the like to set a value such as a counter value in each buffer of a counter or the like provided in a predetermined region in the RAM 206 (step S203). FIG. 11 is a view illustrating an example of setting of each buffer.

In step S203, as illustrated in FIG. 11, for example, based on the latency value "010 (three bit)" included in the connection request signal, the control unit 202 sets, as a value of the number of times of latency (lat value), "2" indicating twice as the number of times of latency in a buffer of the number of times of latency (lat). Note that during the execution of the data transmission/reception processing in step S204 described later, for example, a latency value update signal including a changed latency value may be received from the communication terminal 100 and the value of the number of times of latency may be changed based on the latency value included in the received latency value update signal.

Also, in step S203, as an initial value of a latency counter value (C_lat value), the control unit 202 sets, in a latency counter (C_lat), "2" indicating twice as the number of times of latency. Thus, right after connection with the communication terminal 100 is performed, a slave latency operation in which the number of times of latency is twice is performed. Note that "1" indicating once as the number of times of latency may be set as an initial value of the latency counter value (C_lat value) in the latency counter (C_lat) and a slave latency operation in which the number of times of latency is once may be performed. Also, "0" indicating zero as the number of times of latency may be set as an initial value of the latency counter value (C_lat value) in the latency counter (C_lat) and the slave latency operation may not be performed.

Also, based on a value which is included in the connection request signal and which indicates a period of a connection event interval, the control unit 202 sets "three seconds" as a period of an interval in an interval counter (C_connint) Note that the period of an interval is not limited to three seconds and may be a period shorter or longer than three seconds.

Also, in step S203, as an initial value of a latency_off counter value (C_latoff value), the control unit 202 sets "2" indicating twice as the number of times of latency_off in a latency_off counter (C_latoff). Note that "1" indicating once as the number of times of latency_off or "0" indicating zero as the number of times of latency_off may be set as an initial value of the latency_off counter value (C_latoff value) in the latency_off counter (C_latoff). In such a manner, by setting a value such as a counter value in each buffer, the control unit 202 functions as a latency setting unit (transmission/reception unnecessity setting unit) to set latency with the communication terminal 100.

Figure 12:
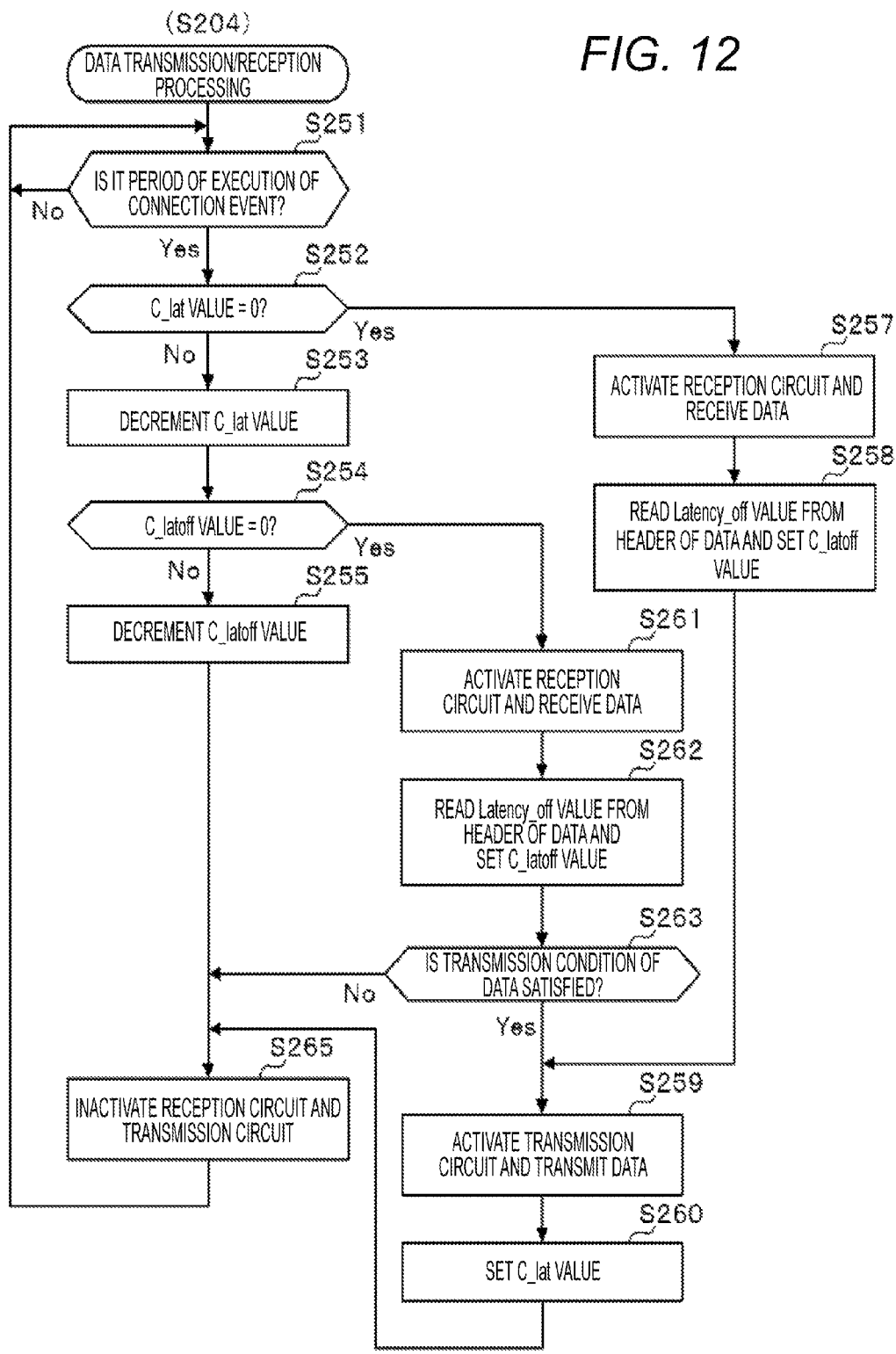
FIG. 12 is a flowchart illustrating an example of data transmission/reception processing executed by the environment information measuring apparatus in FIG. 3.

After executing the processing in step S203, the control unit 202 executes data transmission/reception processing (step S204). FIG. 12 is a flowchart illustrating an example of the data transmission/reception processing in step S204 illustrated in FIG. 10.

As illustrated in FIG. 12, first, the control unit 202 determines whether it is timing of a connection event (step S251). When it is determined in step S251 that it is not the timing of a connection event (step S251; No), the control unit 202 repeatedly executes the processing in step S251 until it becomes the timing of a connection event.

When it is determined in step S251 that it is the timing of a connection event (step S251; Yes), the control unit 202 which functions as the reception limitation unit 253 determines whether the latency counter value (C_lat value) is "0" (step S252). When it is determined in step S252 that the latency counter value is not "0" (step S252; No), the control unit 202 decrements (subtract one from) the latency counter value (step S253). After executing the processing in step S253, the control unit 202 which functions as the limitation releasing unit 255 determines whether the latency_off counter value (C_latoff value) is "0" (step S254). When it is determined in step S254 that the latency_off counter value is not "0" (step S254; No), the control unit 202 decrements (subtract one from) the latency_off counter value (step S255).

Also, when it is determined in step S252 that the latency counter value is "0" (step S252; Yes), the control unit 202 which functions as the data reception unit 251 (reception control information reception unit) activates the reception circuit of the radio communication operation unit 210 and receives the data from the communication terminal 100 (step S257). In such a manner, the control unit 202 receives a latency_off value which is information to control reception during latency along with a different data value. After executing the processing in step S257, the control unit 202 which functions as the setting unit 254 reads a latency_off value from a header of the data received in step S257 and sets a latency_off counter value (C_latoff value) in the latency_off counter (C_latoff) based on the read latency_off value (step S258). In step S258, for example, when the latency_off value is "001 (three bit)", the control unit 202 sets "1" as a latency_off counter value in the latency_off counter. Note that when the latency_off value is "000 (three bit)" or "010 (three bit)", a latency_off counter value "0" or "2" is also set in the latency_off counter in a manner similar to what has been described above.

After executing the processing in step S258, the control unit 202 which functions as the data transmission unit 252 activates the transmission circuit of the radio communication operation unit 210 and transmits data to the communication terminal 100 (step S259). After executing the processing in step S259, the control unit 202 sets (overwrite with), for example, "2" as the latency counter value (C_lat value) (step S260). Accordingly, twice is set as the number of times of latency. Note that in step S260, for example, the control unit 202 may set any one of "0" to "2" as the latency counter value (C_lat value) according to an amount of remaining battery.

Also, when it is determined in step S254 that the latency_off counter value is "0" (step S254; Yes), the control unit 202 which functions as the data reception unit 251 activates the reception circuit of the radio communication operation unit 210 and receives the data from the communication terminal 100 (step S261). In such a manner, when the number of times of transmission of the data transmitted from the communication terminal 100 reaches the number of times of latency_off, the limitation of reception of data due to the determination of "No" in step S252 is released and data is received by the data reception unit 251. After executing the processing in step S261, the control unit 202 which functions as the setting unit 254 reads a latency_off value from a header of the data received in step S261 and sets a latency_off counter value (C_latoff value) in the latency_off counter (C_latoff) based on the read latency_off value (step S262). In step S262, similarly to the processing in step S258, any one of latency_off counter values "0", "1", and "2" is set in the latency_off counter.

In such a manner, the control unit 202 sets a latency_off counter value by the processing in step S258 or in step S262. Then, in step S254, it is determined whether the latency_off counter value is "0". When the latency_off counter value is "0", data from the communication terminal 100 is received. Thus, the control unit 202 functions as a reception control unit to control reception of data from the communication terminal 100 based on a latency_off value which is information to control reception during latency.

After executing the processing in step S262, the control unit 202 which functions as the transmission condition determination unit 256 determines whether a transmission condition of data to transmit data to the communication terminal 100 is satisfied (step S263). In step S263, the control unit 202 reads a data value of a payload and determines that the transmission condition of data is not satisfied when the data value is a data value indicating emptiness such as "0". Also, when the data value of the payload is a data value other than the data value indicating emptiness such as "0", the control unit 202 determines that the transmission condition of the data is satisfied. When it is determined in step S263 that the transmission condition of the data is satisfied (step S263; Yes), the control unit 202 executes the processing in step S259 and transmits data. Also, when it is determined in step S263 that the transmission condition of the data is not satisfied (step S263; No), the control unit 202 does not executes the processing in step S259. Thus, the control unit 202 does not transmit the data to the communication terminal 100.

After the processing in step S255 or in step S260 is executed or when it is determined step S263 that the transmission condition of the data is not satisfied (step S263; No), the control unit 202 inactivates the transmission circuit and the reception circuit of the radio communication operation unit 210 (step S265). After executing the processing in step S265, the control unit 202 executes the processing in step S251.

Note that the data transmission/reception processing in step S204 is ended, for example, when disconnection is selected by operation in the operation unit 220 performed by a user or when selection to turn off a power source is performed. After the processing in step S204 is executed, the control unit 202 ends the communication processing.

Figure 13:
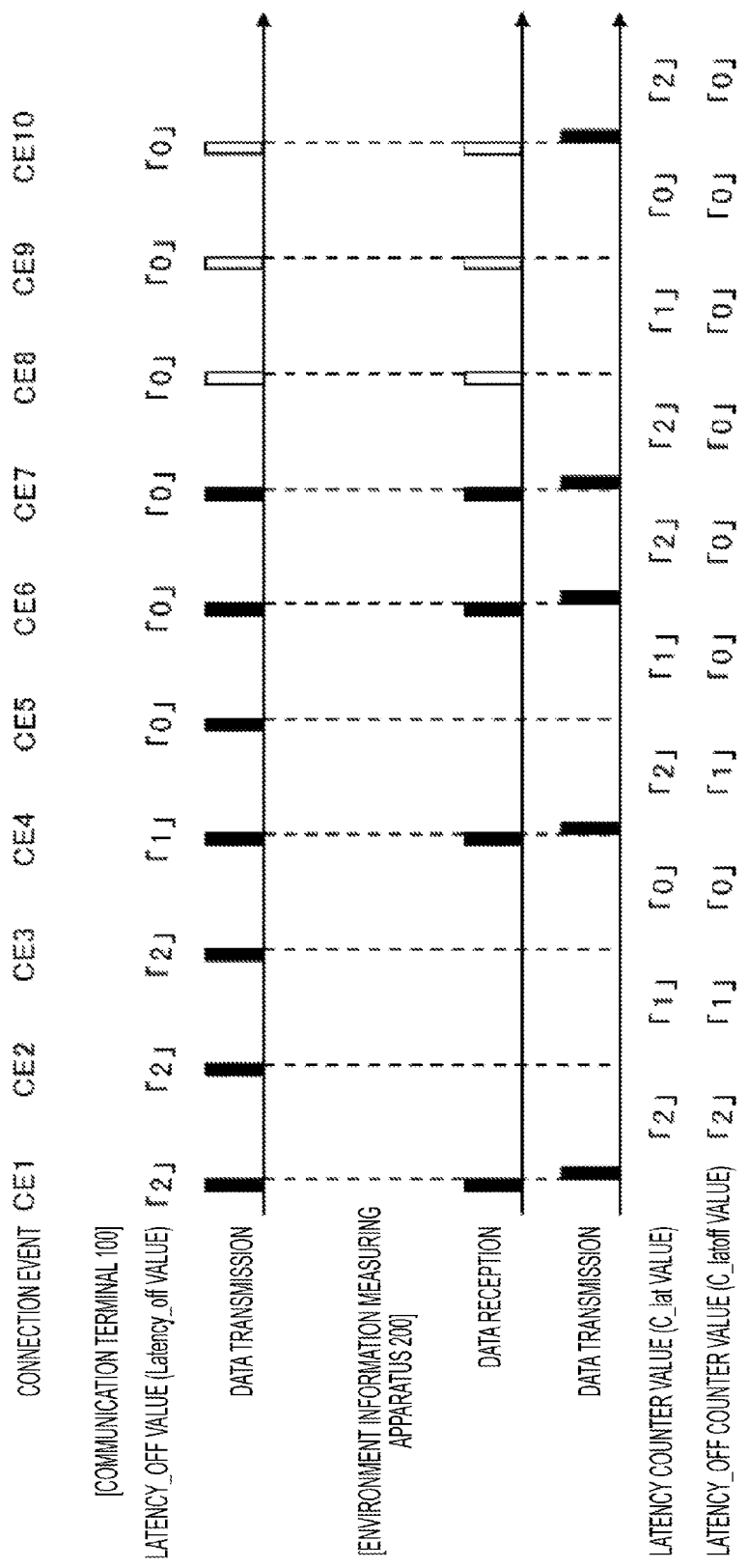
FIG. 13 is a view illustrating an example of timing of the data transmission/reception in the radio communication system in FIG. 1.

FIG. 13 is a view illustrating an example of timing of transmission/reception of data performed by the radio communication system 1 according to the present embodiment. Note that in FIG. 13, a black bar indicates data in which a payload is not empty and a white bar indicates data (empty data) in which a payload is empty.

In a connection event CE1, the communication terminal 100 transmits data including "2" as a latency_off value. After receiving data from the communication terminal 100, the environment information measuring apparatus 200 transmits data to the communication terminal 100. By the processing in the connection event CE1, a latency counter value (C_lat value) of the environment information measuring apparatus 200 becomes "2" and a latency_off counter value (C_latoff value) thereof becomes "2".

In a connection event CE2, the communication terminal 100 transmits data including "2" as a latency_off value. Since each of the latency counter value and the latency_off counter value is not "0", the environment information measuring apparatus 200 does not receive the data from the communication terminal 100. By the processing in the connection event CE2, a latency counter value (C_lat value) of the environment information measuring apparatus 200 is "1" and a latency_off counter value (C_latoff value) thereof becomes "1".

Similarly to the connection event CE2, in a connection event CE3, the environment information measuring apparatus 200 does not receive the data from the communication terminal 100. By the processing in the connection event CE3, a latency counter value (C_lat value) of the environment information measuring apparatus 200 becomes "0" and a latency_off counter value (C_latoff value) thereof becomes "0".

In a connection event CE4, the communication terminal 100 transmits data including "1" as a latency_off value. Since the latency counter value is "0", the environment information measuring apparatus 200 transmits data to the communication terminal 100 after receiving the data from the communication terminal 100. By the processing in the connection event CE4, a latency counter value (C_lat value) of the environment information measuring apparatus 200 becomes "2" and a latency_off counter value (C_latoff value) thereof becomes "1".

In a connection event CE5, the communication terminal 100 transmits data including "0" as a latency_off value. Since each of the latency counter value and the latency_off counter value is not "0", the environment information measuring apparatus 200 does not receive the data from the communication terminal 100. By the processing in the connection event CE5, a latency counter value (C_lat value) of the environment information measuring apparatus 200 becomes "1" and a latency_off counter value (C_latoff value) thereof becomes "0".

In a connection event CE6, the communication terminal 100 transmits data including "0" as a latency_off value. Since the latency_off counter value is "0", the environment information measuring apparatus 200 receives the data from the communication terminal 100. Then, since the received data is not empty data, the environment information measuring apparatus 200 determines that a transmission condition of data is satisfied and transmits the data to the communication terminal 100. By the processing in the connection event CE6, a latency counter value (C_lat value)

of the environment information measuring apparatus 200 becomes "2" and a latency_off counter value (C_latoff value) thereof becomes "0".

In a connection event CE7, the communication terminal 100 transmits data including "0" as a latency_off value. Since the latency_off counter value is "0", the environment information measuring apparatus 200 receives the data from the communication terminal 100. Then, since the received data is not empty data, the environment information measuring apparatus 200 determines that a transmission condition of data is satisfied and transmits the data to the communication terminal 100. By the processing in the connection event CE7, a latency counter value (C_lat value) of the environment information measuring apparatus 200 becomes "2" and a latency_off counter value (C_latoff value) thereof becomes "0".

In a connection event CE8, the communication terminal 100 transmits empty data including "0" as a latency_off value. Since the latency_off counter value is "0", the environment information measuring apparatus 200 receives the empty data from the communication terminal 100. However, since the received data is empty data, the environment information measuring apparatus 200 determines that a transmission condition of data is not satisfied and does not transmit the data to the communication terminal 100. By the processing in the connection event CE8, a latency counter value (C_lat value) of the environment information measuring apparatus 200 becomes "1" and a latency_off counter value (C_latoff value) thereof becomes "0".

In a connection event CE9, the communication terminal 100 transmits empty data including "0" as a latency_off value. Since the latency_off counter value is "0", the environment information measuring apparatus 200 receives the empty data from the communication terminal 100. However, since the received data is empty data, the environment information measuring apparatus 200 determines that a transmission condition of data is not satisfied and does not transmit data to the communication terminal 100. By the processing in the connection event CE9, a latency counter value (C_lat value) of the environment information measuring apparatus 200 becomes "0" and a latency_off counter value (C_latoff value) thereof becomes "0".

In a connection event CE10, the communication terminal 100 transmits empty data including "0" as a latency_off value. Since the latency counter value is "0", the environment information measuring apparatus 200 transmits data to the communication terminal 100 after receiving the empty data from the communication terminal 100. By the processing in the connection event CE10, a latency counter value (C_lat value) of the environment information measuring apparatus 200 becomes "2" and a latency_off counter value (C_latoff value) becomes "0".

Next, an active period of the transmission/reception circuit of the radio communication operation unit 210 of the environment information measuring apparatus 200 will be described with reference to FIG. 14.

Figure 14:
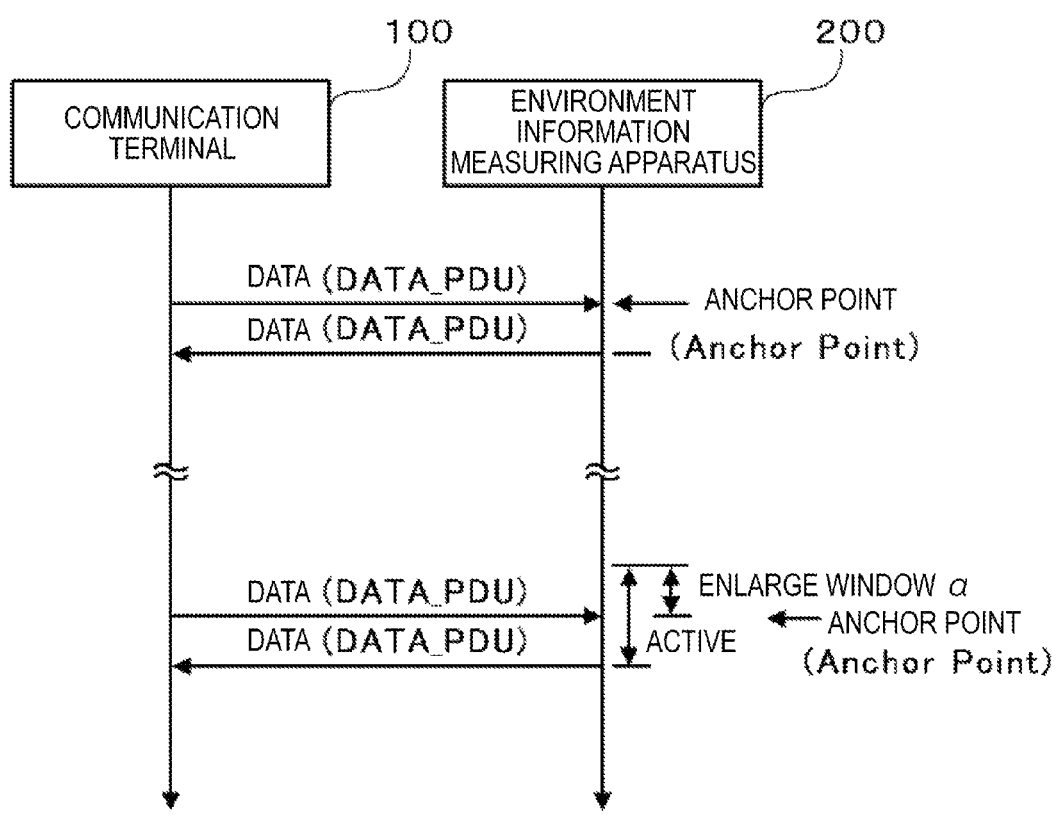
FIG. 14 is a view for describing an active period of a transmission/reception circuit of the environment information measuring apparatus.

As illustrated in FIG. 14, at timing to start a connection event, that is, timing at which the environment information measuring apparatus 200 actually receives data (DATA_PDU) from the communication terminal 100 is referred to as an anchor point. By execution of the connection operation processing of the communication terminal 100 and the connection operation processing of the environment information measuring apparatus 200 which are described above, timing of a connection event is synchronized and set in the communication terminal 100 and the environment information measuring apparatus 200. However, a gap is generated between clock timing of a CPU included in the communication terminal 100 and clock timing of a CPU included in the environment information measuring apparatus 200. Thus, when the reception circuit of the environment information measuring apparatus 200 is brought into the operation state at the timing to start a connection event, there may be a case where the environment information measuring apparatus 200 fails to receive data from the communication terminal 100. Thus, the environment information measuring apparatus 200 brings the reception circuit of the radio communication operation unit 210 into the operation state at timing before the timing to start a connection event for a period of enlarging a window α.

The period of enlarging a window α is calculated, for example, by the following equation:

period of enlarging window α (second)={[clock accuracy of CPU included in communication terminal 100 (ppm)+ clock accuracy of CPU included in environment information measuring apparatus 200 (ppm)]/1000000}*elapsed period from previous anchor point (second).

According to the above equation, the period of enlarging a window α becomes longer as an elapsed period from the previous anchor point becomes longer. When the slave latency operation is executed, the period of enlarging a window α becomes long and an active period of a whole transmission/reception circuit of the environment information measuring apparatus 200 becomes long. Thus, when the slave latency operation is executed, power consumption for one transmission/reception of data in the environment information measuring apparatus 200 becomes large compared to a case where the slave latency operation is not executed. However, according to the present embodiment, when the number of times of transmission of data intermittently transmitted from the communication terminal 100 reaches the number of times of latency_off smaller than the number of times of latency, the environment information measuring apparatus 200 can receive data. When the environment information measuring apparatus 200 receives data, timing at which the data is received becomes an anchor point. Accordingly, the number of anchor points is increased compared to the case where the number of times of latency_off is not set. Thus, it is possible to prevent the period of enlarging a window α from becoming long. Accordingly, power consumption for one transmission/reception of data in the environment information measuring apparatus 200 can be controlled.

As described above, according to the environment information measuring apparatus 200 of the above embodiment, the number of times of latency_off is set, for example, by setting a latency_off counter value (C_latoff value) in the latency_off counter (C_latoff) in step S258 or in step S262 as illustrated in FIG. 12. Even when it is determined in step S252 that the latency counter value (C_lat value) is not "0", in a case where it is determined in step S254 that the latency_off counter value (C_latoff value) is "0", data from the communication terminal 100 is received. That is, even when reception of data is limited in the slave latency operation, the limitation of reception of data is released based on a latency_off value included in the data transmitted from the communication terminal 100 and the data from the communication terminal 100 is received. Thus, since reception of data in the environment information measuring apparatus 200 is controlled by the communication terminal 100, it is possible to prevent a response speed of the communication terminal 100 from being limited.

According to the environment information measuring apparatus 200 of the above embodiment, for example, when it is determined in step S263 that a transmission condition of data is not satisfied (step S263; No), the data is not transmitted to the communication terminal 100. Accordingly, an active period of the transmission/reception circuit of the radio communication operation unit 210 of the environment information measuring apparatus 200 becomes short. Thus, it is possible to control power consumption.

According to the communication terminal 100 of the above embodiment, transmission of data is intermittently and repeatedly executed at connection event intervals. In the transmitted data, a latency_off value indicating the number of times of latency_off smaller than the number of times of latency is included. Accordingly, when the number of times that reception of the data intermittently transmitted from the communication terminal 100 is limited reaches the number of times of latency_off indicated by the latency_off value included in the received data, the environment information measuring apparatus 200 releases the limitation of reception of the data. Thus, it is possible to control reception of data in the environment information measuring apparatus 200 while performing transmission/reception of data with the environment information measuring apparatus 200.

According to the communication terminal 100 of the above embodiment, for example, when it is determined in step S156 or in step S157 whether a change condition such as a first change condition or a second change condition is satisfied during execution of the data transmission/reception processing in step S105 and when it is determined that the change condition is satisfied, a latency_off value is changed in step S158 or in step S159. Then, data including the changed latency_off value is transmitted to the environment information measuring apparatus 200. Thus, it is possible to control a reception frequency of data in the environment information measuring apparatus 200.

According to the communication terminal 100 of the above embodiment, for example, it is determined in step S156 whether the first change condition is satisfied during execution of the data transmission/reception processing in step S105 and when it is determined that the first change condition is satisfied, a latency_off value is changed in step S158 and the number of times of latency_off is reduced. Also, it is determined in step S157 whether the second change condition is satisfied. When it is determined that the second change condition is satisfied, a latency_off value is changed in step S159 and the number of times of latency_off is increased. Thus, it is possible to increase or reduce a reception frequency of data in the environment information measuring apparatus 200.

According to the radio communication system 1 of the above embodiment, the communication terminal 100 intermittently and repeatedly executes transmission of data at connection event intervals. In the data transmitted from the communication terminal 100, a latency_off value indicating the number of times of latency_off is included. For example, as illustrated in FIG. 12, by setting a latency_off counter value in the latency_off counter in step S258 or in step S262, the environment information measuring apparatus 200 sets the number of times of latency_off. Even when it is determined in step S252 that the latency counter value is not "0", in a case where it is determined in step S254 that the latency_off counter value is "0", data from the communication terminal 100 is received. That is, even when reception of data is limited in the slave latency operation, the limitation of reception of data is released based on a latency_off value included in the data transmitted from the communication terminal 100 and the data from the communication terminal 100 is received. In such a manner, when the number of times that reception of the data intermittently transmitted from the communication terminal 100 is limited reaches the number of times of latency_off indicated by the latency_off value included in the received data, the environment information measuring apparatus 200 releases the limitation of reception of the data. Thus, it is possible for the communication terminal 100 to control reception of data in the environment information measuring apparatus 200 while performing transmission/reception of data with the environment information measuring apparatus 200. Since reception of data in the environment information measuring apparatus 200 is controlled by the communication terminal 100, it is possible to prevent a response speed of the communication terminal 100 from being limited.

In the above, an embodiment of the present invention has been described. However, the present invention is not limited to the above embodiment.

In the above embodiment, the radio communication system 1 includes the communication terminal 100 as a master device and the environment information measuring apparatus 200 as a slave device. However, the radio communication system 1 is not limited to what includes the communication terminal 100 and the environment information measuring apparatus 200. For example, the radio communication system 1 may include an alarm apparatus and the communication terminal 100, the alarm apparatus including a sensor to detect unauthorized intrusion and being included as a slave device. Also, for example, the radio communication system 1 may include a pollen measuring apparatus and the communication terminal 100, the pollen measuring apparatus including a sensor to measure an amount of pollen and being included as a slave device.

In the above embodiment, it is assumed that a smartphone is a master device. However, a radio communication apparatus to be a master device is not limited to a smartphone. For example, a watch capable of performing radio communication based on the BLE may be used as a master device and a smartphone or a mobile phone including a function to receive an email may be used as a slave device. According to such a configuration, for example, when the smartphone or the like receives an email, it is possible to display, on the watch or the like, information indicating that the email is received.

In the above embodiment, a data value in a payload is read in step S263 and when the data value is a data value indicating emptiness such as "0", it is determined that a transmission condition of data is not satisfied. However, a method to determine whether a transmission condition of data is satisfied is not limited to the above method. For example, when a data value stored in the field 312 (Length) of the header 301 of the data is read and in a case where the data value is a data value, such as "0", indicating a bit length of a data value stored in the payload 302, it may be determined that the transmission condition of data is not satisfied.

In the above embodiment, a latency_off value is stored in the field 311 (RFU-1) in the header 301. However, a place to store the latency_off value is not limited to the header 301. For example, the latency_off value may be stored in a predetermined region in the payload 302.

In the above embodiment, by decrementing (subtracting one from) a latency counter value stored in the latency counter and a latency_off counter value stored in the latency_off counter at timing of each connection event, the number of times of transmission of data transmitted from the communication terminal 100 is determined. However, a method to determine the number of times of transmission of the data transmitted from the communication terminal 100 is not limited to the above method. For example, by incrementing (adding one to) a latency counter value stored in the latency counter and a latency_off counter value stored in the latency_off counter at timing of each connection event, the number of times of transmission of data transmitted from the communication terminal 100 may be determined.

Also, the communication terminal 100 and the environment information measuring apparatus 200 according to an embodiment of the present invention can be realized not only by a special apparatus but also by a normal computer system. For example, by execution of a program performed by a computer, a function of the communication terminal 100 and a function of the environment information measuring apparatus 200 may be realized. A program to realize the function of the communication terminal 100 and the function of the environment information measuring apparatus 200 may be stored in a computer-readable recording medium such as a universal serial bus (USB) memory, a secure digital (SD) memory card, a compact disc read only memory (CD-ROM), a digital versatile disc (DVD), a Blu-ray (registered trademark) Disc (BD), or a hard disk drive (HDD) or may be downloaded into a computer through a network. Note that the control unit or the communication unit may be one configuration or a plurality of configurations.

In the above, a preferred embodiment of the present invention has been described. However, the present invention is not limited to the specific embodiment. The present invention includes an invention described in the claims and an equivalent thereof.

What is claimed is:

1. A radio communication apparatus configured to perform radio communication with a radio communication apparatus of a communication partner, comprising:
   a communication unit configured to:
      receive data intermittently transmitted from the radio communication apparatus of the communication partner; and
      transmit data to the radio communication apparatus of the communication partner based on the received data; and
   a control unit configured to:
      limit reception of data until a number of times of transmission of the data intermittently transmitted from the radio communication apparatus of the communication partner reaches a number of times of limitation of reception of data;
      set a specific number of times which is indicated by specific information included in the received data and which is smaller than the number of times of limitation; and
      release the limitation of the reception of data when the number of times of transmission of the data intermittently transmitted from the radio communication apparatus of the communication partner reaches the specific number of times,
   wherein after the limitation is released, the control unit determines, based on the received data, whether a data transmission condition to transmit data to the radio communication apparatus of the communication partner is satisfied, and
   wherein when it is determined that the data transmission condition is satisfied, the communication unit transmits the data to the radio communication apparatus of the communication partner.

2. A radio communication apparatus configured to perform radio communication with a radio communication apparatus of a communication partner, comprising:
   a communication unit configured to intermittently transmit, to the radio communication apparatus of the communication partner, data including specific information indicating a specific number of times smaller than a number of times of limitation; and
   a control unit configured to release limitation of reception of the data when a number of times that reception of the data intermittently transmitted from the communication unit is limited by the radio communication apparatus of the communication partner reaches the specific number of times indicated by the specific information included in the received data,
   wherein the number of times of limitation is the number of times that the radio communication apparatus of the communication partner limits reception of the data intermittently transmitted from the communication unit,
   wherein the control unit determines whether a change condition to change the specific number of times is satisfied when the data is intermittently transmitted, and
   wherein when it is determined that the change condition is satisfied, the specific information is changed into specific information indicating the specific number of times changed for a predetermined number, and the communication unit transmits data including the changed specific information.

3. The radio communication apparatus according to claim 2, wherein the control unit determines whether a first change condition to reduce the specific number of times is satisfied as the change condition and determines whether a second change condition to increase the specific number of times is satisfied as the change condition, and
   wherein when it is determined that the first change condition is satisfied, the specific information is changed into specific information indicating the specific number of times after a predetermined number is reduced, and when it is determined that the second change condition is satisfied, the specific information is changed into specific information indicating the specific number of times after a predetermined number is increased.

4. A radio communication method of performing radio communication with a radio communication apparatus of a communication partner, comprising:
   receiving data intermittently transmitted from the radio communication apparatus of the communication partner;
   transmitting data to the radio communication apparatus of the communication partner based on the received data;
   limiting reception of data until a number of times of transmission of the data intermittently transmitted from the radio communication apparatus of the communication partner reaches a number of times of limitation of reception of data;
   setting a specific number of times which is indicated by specific information included in the received data and which is smaller than the number of times of limitation; and
   releasing the limitation of the reception of data when the number of times of transmission of the data intermittently transmitted from the radio communication apparatus of the communication partner reaches the specific number of times, wherein after the limitation is released, it is determined, based on the received data, whether a data transmission condition to transmit data to the radio communication apparatus of the communication partner is satisfied, and wherein when it is determined that the data transmission condition is satisfied, data is transmitted to the radio communication apparatus of the communication partner.

5. A non-transitory computer-readable medium having a program stored thereon which is executable to control a computer configured to perform radio communication with a radio communication apparatus of a communication partner to perform functions comprising:

data reception processing to receive data intermittently transmitted from the radio communication apparatus of the communication partner, data transmission processing to transmit data to the radio communication apparatus of the communication partner based on the data received in the data reception processing, reception limiting processing to limit reception of data in the data reception processing until a number of times of transmission of the data intermittently transmitted from the radio communication apparatus of the communication partner reaches a number of times of limitation of reception of data, setting processing to set a specific number of times which is indicated by specific information included in the data received in the data reception processing and which is smaller than the number of times of limitation, limitation releasing processing to release the limitation by the reception limiting processing when the number of times of transmission of the data intermittently transmitted from the radio communication apparatus of the communication partner reaches the specific number of times, after the limitation is released, determination processing to determine, based on the data received in the data reception processing, whether a data transmission condition to transmit data to the radio communication apparatus of the communication partner is satisfied, and when it is determined that the data transmission condition is satisfied, transmission processing to transmit data to the radio communication apparatus of the communication partner.

6. A slave device configured to perform radio communication with a master device, comprising:

a communication unit configured to receive data intermittently transmitted from the master device and to transmit data to the master device based on the received data, wherein reception of data is limited until a number of times of transmission of the data intermittently transmitted from the master device reaches a number of times of limitation of reception of the data, wherein a specific number of times which is indicated by specific information included in the data received by the communication unit and which is smaller than the number of times of limitation is set, wherein the limitation is released when the number of times of transmission of the data intermittently transmitted from the master device reaches the specific number of times, wherein after the limitation is released, it is determined, based on the received data, whether a data transmission condition to transmit data to the master device is satisfied, and wherein when it is determined that the data transmission condition is satisfied, the communication unit transmits the data to the master device.

7. A radio communication method of performing radio communication with a radio communication apparatus of a communication partner, comprising:

intermittently transmitting, to the radio communication apparatus of the communication partner, data including specific information indicating a specific number of times smaller than a number of times of limitation; and releasing limitation of reception of the data when a number of times that reception of the data intermittently transmitted is limited by the radio communication apparatus of the communication partner reaches the specific number of times indicated by the specific information included in the received data, wherein the number of times of limitation is the number of times that the radio communication apparatus of the communication partner limits reception of the data intermittently transmitted from the communication unit, wherein it is determined whether a change condition to change the specific number of times is satisfied when the data is intermittently transmitted, and wherein when it is determined that the change condition is satisfied, the specific information is changed into specific information indicating the specific number of times changed for a predetermined number, and data including the changed specific information is transmitted.

8. A non-transitory computer-readable medium having a program stored thereon which is executable to control a computer configured to perform radio communication with a radio communication apparatus of a communication partner to perform functions comprising:

data transmitting processing to intermittently transmit, to the radio communication apparatus of the communication partner, data including specific information indicating a specific number of times smaller than a number of times of limitation; and data reception processing to release limitation of reception of the data when a number of times that reception of the data intermittently transmitted is limited by the radio communication apparatus of the communication partner reaches the specific number of times indicated by the specific information included in the received data, wherein the number of times of limitation is the number of times that the radio communication apparatus of the communication partner limits reception of the data intermittently transmitted from the communication unit, wherein it is determined whether a change condition to change the specific number of times is satisfied when the data is intermittently transmitted, and wherein when it is determined that the change condition is satisfied, the specific information is changed into specific information indicating the specific number of times changed for a predetermined number, and data including the changed specific information is transmitted.

9. A master device configured to perform radio communication with a slave device, comprising:

a communication unit configured to intermittently transmit, to the slave device, data including specific information indicating a specific number of times smaller than a number of times of limitation; and a control unit configured to release limitation of reception of the data when a number of times that reception of the data intermittently transmitted from the communication unit is limited by the slave device reaches the specific number of times indicated by the specific information included in the received data, wherein the number of times of limitation is the number of times that the slave device limits reception of the data intermittently transmitted from the communication unit, wherein the control unit determines whether a change condition to change the specific number of times is satisfied when the data is intermittently transmitted, and wherein when it is determined that the change condition is satisfied, the specific information is changed into specific information indicating the specific number of times changed for a predetermined number, and the communication unit transmits data including the changed specific information.

* * * * *